US012598395B2

(12) United States Patent
Shoji

(10) Patent No.: US 12,598,395 B2
(45) Date of Patent: Apr. 7, 2026

(54) ELECTRONIC DEVICE, CONTROL METHOD THEREOF AND NON-TRANSITORY COMPUTER-READABLE MEDIUM

(71) Applicant: CANON KABUSHIKI KAISHA, Tokyo (JP)

(72) Inventor: Ryota Shoji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 18/397,101

(22) Filed: Dec. 27, 2023

(65) Prior Publication Data

US 2024/0236503 A1     Jul. 11, 2024

(30) Foreign Application Priority Data

Jan. 10, 2023     (JP) ................................. 2023-001742

(51) Int. Cl.
*H04N 23/80*          (2023.01)
*H04N 23/55*          (2023.01)
*H04N 23/62*          (2023.01)
(52) U.S. Cl.
CPC ............. *H04N 23/80* (2023.01); *H04N 23/55* (2023.01); *H04N 23/62* (2023.01)

(58) Field of Classification Search
CPC ........ H04N 23/80; H04N 23/55; H04N 23/62; H04N 23/634; H04N 23/6812; H04N 23/663; H04N 5/91; H04N 23/54; H04N 23/63
See application file for complete search history.

(56) References Cited

U.S. PATENT DOCUMENTS

| | | | | |
|---|---|---|---|---|
| 2012/0236128 A1* | 9/2012 | Ueda | .................... | H04N 13/246 348/E13.074 |
| 2013/0258122 A1* | 10/2013 | Keane | ................ | H04N 23/6812 348/208.4 |
| 2022/0217325 A1* | 7/2022 | Lee | ........................ | G06V 40/19 |

FOREIGN PATENT DOCUMENTS

JP          2017-199985 A     11/2017

* cited by examiner

*Primary Examiner* — Christopher K Peterson
(74) *Attorney, Agent, or Firm* — Venable LLP

(57) ABSTRACT
An electronic device acquires a captured image. The electronic device, in a case where the captured image is an image acquired by imaging of an imaging device to which a dual lens is attached, first information which is information associated with the captured image and is information associated with a phenomenon that possibly cause a specific symptom. The electronic device records the captured image and the first information in a recording unit so that the captured image relates to the first information.

20 Claims, 12 Drawing Sheets

ELECTRONIC DEVICE, CONTROL METHOD THEREOF AND NON-TRANSITORY COMPUTER-READABLE MEDIUM

BACKGROUND OF THE INVENTION

Field of the Invention

The present invention relates to an electronic device and a control method thereof.

Description of the Related Art

An imaging device is a lens having two optical systems on one lens mount (hereafter referred to as "dual lens"), and may be used to capture an image with parallax (parallax image). And a technique is known to display this captured parallax image (hereafter called "VR image") as a stereoscopic VR image.

Japanese Patent Application Publication No. 2017-199985 discloses a technique to determine whether or not a frame is a reproduceable frame, so that unnatural images are displayed when a user is viewing VR images. According to this technique, the apparatus controls a display unit to display a reproduceable frame instead of an unreproducible frame.

In a case where a left eye image and a right eye image in a VR image have a major difference, a user viewing the VR image may experience specific symptoms (e.g., fatigue, VR sickness). However, a display device which displays a VR image and a user viewing the VR image have not recognized in advance the possibility of specific symptoms a user may experience.

Hence a VR image which may possibly cause specific symptoms may be displayed and reproduced, and reducing this possibility of causing the specific symptoms to the user has been difficult.

SUMMARY OF THE INVENTION

With the foregoing in view, it is an object of the present invention to provide a technique to contribute to reducing the possibility of causing specific symptoms to a user viewing a VR moving image.

An aspect of the invention is an electronic device, including: a processor; and a memory storing a program which, when executed by the processor, causes the electronic device to: acquire a captured image, acquire, in a case where the captured image is an image acquired by imaging of an imaging device to which a dual lens is attached, first information, which is information associated with the captured image and is information associated with a phenomenon that possibly cause a specific symptom, and record the captured image and the first information in a recording unit so that the captured image relates to the first information.

An aspect of the invention is an electronic device including: a processor; and a memory storing a program which, when executed by the processor, causes the electronic device to: acquire a captured image, and first information which is information associated with the captured image and is information associated with a phenomenon that possibly cause a specific symptom, and control display of the captured image on a display device based on the first information, in a case where the captured image is an image captured by an imaging device to which a dual lens is attached.

An aspect of the invention is a control method for an electronic device, including the steps of: acquiring a captured image; acquiring, in a case where the captured image is an image acquired by imaging of an imaging device to which a dual lens is attached, first information which is information associated with the captured image and is information associated with a phenomenon that possibly cause a specific symptom; and recording the captured image and the first information in a recording unit so that the captured image relates to the first information.

An aspect of the invention is a control method for the electronic device, comprising steps of: acquiring a captured image, and first information which is information associated with the captured image and is information associated with a phenomenon that possibly cause a specific symptom; and controlling display of the captured image on a display device based on the first information, in a case where the captured image is an image captured by an imaging device to which a dual lens is attached.

Further features of the present invention will become apparent from the following description of exemplary embodiments with reference to the attached drawings.

BRIEF DESCRIPTION OF THE DRAWINGS

FIG. 3 is a diagram for describing a lens unit according to Embodiment 1;

DESCRIPTION OF THE EMBODIMENTS

Embodiments of the present invention will now be described in detail with reference to the drawings.

Embodiment 1

An imaging device (electronic device) according to Embodiment 1 is implemented by a digital camera which is equipped with dual lens (VR180 lens), and which captures a moving image. The digital camera 100 that captures the image will be described below.

Figures 1A, 1B:
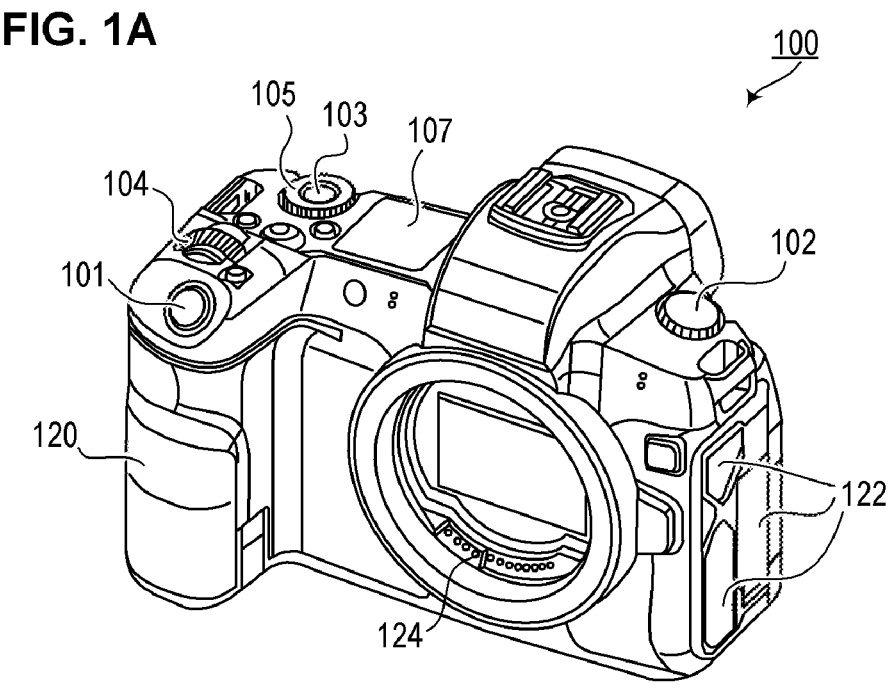
FIGS. 1A and 1B are external views of a camera according to Embodiment 1.

FIGS. 1A and 1B are diagrams depicting an example of an external configuration of a digital camera (hereafter called "camera") 100. FIG. 1A is a perspective view when the camera 100 is viewed from the front side, and FIG. 1B is a perspective view when the camera 100 is viewed from the rear side.

A camera 100 includes: a shutter button 101, a power supply switch 102, a mode selection switch 103, a main electronic dial 104, a sub-electronic dial 105, a video button 106, and an outer finder display unit 107 on the upper surface.

The shutter button 101 is an operation unit to prepare for image capturing or to instruct image capturing. The power supply switch 102 is an operation unit to switch ON/OFF of a power supply of the camera 100. The mode selection switch 103 is an operation unit to switch various modes. The main electronic dial 104 is a rotational operation unit to change the set values of shutter speed, aperture, and the like. The sub-electronic dial 105 is a rotational operation unit to move a selection frame (cursor) and to switch images, for example. The video button 106 is an operation unit to instruct the start/stop of moving image capturing (recording). The outer finder display unit 107 displays various set values of shutter speed, aperture, and the like.

The camera 100 also includes: a display unit 108, a touch panel 109, a direction key 110, a SET button 111, [and] an AE lock button 112, a magnifying button 113, a reproduction button 114, and a menu button 115 on the rear surface. The camera 100 also includes an eyepiece unit 116, an eye approach detection unit 118, and a touch bar 119 on the rear surface.

The display unit 108 displays an image and various information. The touch panel 109 is an operation unit that detects a touch operation on a display surface (touch operation surface) of the display unit 108. The direction key 110 is an operation unit, including a key of which top, bottom, left and right portion can be pressed (four-direction key). In the camera 100, control can be performed in accordance with the position of the direction key 110 that is pressed. The SET button 111 is an operation unit that is pressed mainly to determine a selected item. The AE lock button 112 is an operation unit that is pressed to fix the exposure state in the image capturing standby state.

The magnifying button 113 is an operation unit to switch the ON/OFF of the magnifying mode in live view display (LV display) in the image capturing mode. In a case where the magnifying mode is ON, the live view image (LV image) is magnified or demagnified by operating the main electronic dial 104. The magnifying button 113 is also used to magnify a reproduced image in the reproduction mode, and to increase a magnification ratio.

The reproduction button 114 is an operation unit to switch the image capturing mode and the reproduction mode. If the reproduction button 114 is pressed in the image capturing mode, the reproduction mode starts where the latest image, out of the images recorded in a recording medium 227, can be displayed on the display unit 108.

When the menu button 115 is pressed, a menu screen, in which various settings can be performed, is displayed on the display unit 108. By using the direction key 110 and the SET button 111 while checking the menu screen displayed on the display unit 108, the user can intuitively perform various settings.

The eyepiece unit 116 is an eyepiece of the eyepiece finder (look in type finder) 117. The user can view an image displayed on an electronic view finder (EVF) 217 through the eyepiece unit 116. The eye approach detection unit 118 is a sensor to detect whether the eye of the user is in contact with (or approaching to) the eyepiece unit 116.

The touch bar 119 is a linear touch operation unit (line touch sensor) which can receive a touch operation. The touch bar 119 is disposed at a position where the thumb of the right hand can touch and operate (touchable) in a state of holding the grip unit 120 with the right hand (state of holding the grip unit 120 with the little finger, ring finger and middle finger of the right hand), so that the shutter button 101 can be pressed by the index finger of the right hand. In other words, the touch bar 119 is operable in a state of looking into the eyepiece finder 117 through the eyepiece unit 116, and holding the camera such that the shutter button 101 can be pressed at any time (image capturing attitude). The touch bar 119 can receive a tap operation (operation of touching and releasing within a predetermined period, without moving the touch position), a slide operation to the left or right (operation of touching and then moving the touch position in the touched state), and the like performed on the touch bar 119. The touch bar 119 is an operation unit that is different from the touch panel 109, and does not include a display function. The touch bar 119 of Embodiment 1 is a multifunction bar, and functions as a M-Fn bar, for example.

The camera 100 also includes the grip unit 120, a thumb rest unit 121, a terminal cover 122, a cover 123, a communication terminal 124, and the like. The grip unit 120 is a holding portion that is formed in a shape that the user can easily grip with the right hand, while holding the camera 100. The shutter button 101 and the main electronic dial 104 are disposed at positions where the index finger of the right hand and can operate in the state where the user is holding the camera 100 by gripping the grip unit 120 with the little finger, the ring finger, and the middle finger of the right hand. The sub-electronic dial 105 and the touch bar 119 are disposed at positions where the thumb of the right hand can operate in the above described state. The thumb rest unit 121 (thumb standby position) is a grip portion that is disposed at a position where the thumb of the right hand holding the grip unit 120 can easily rest in a state where no operation unit on the rear surface side of the camera 100 is operated. The thumb rest unit 121 is constituted of a rubber member or the like, to enhance the holding force (gripping sensation).

The terminal cover 122 protects the connectors, such as a connection cable to connect the camera 100 to an external apparatus. The cover 123 covers a slot to store a later mentioned recording medium 227, so as to protect the recording medium 227 and the slot. The communication terminal 124 is a terminal for the camera 100 to communicate with a later mentioned lens unit 200, which is detachable.

Figure 2:
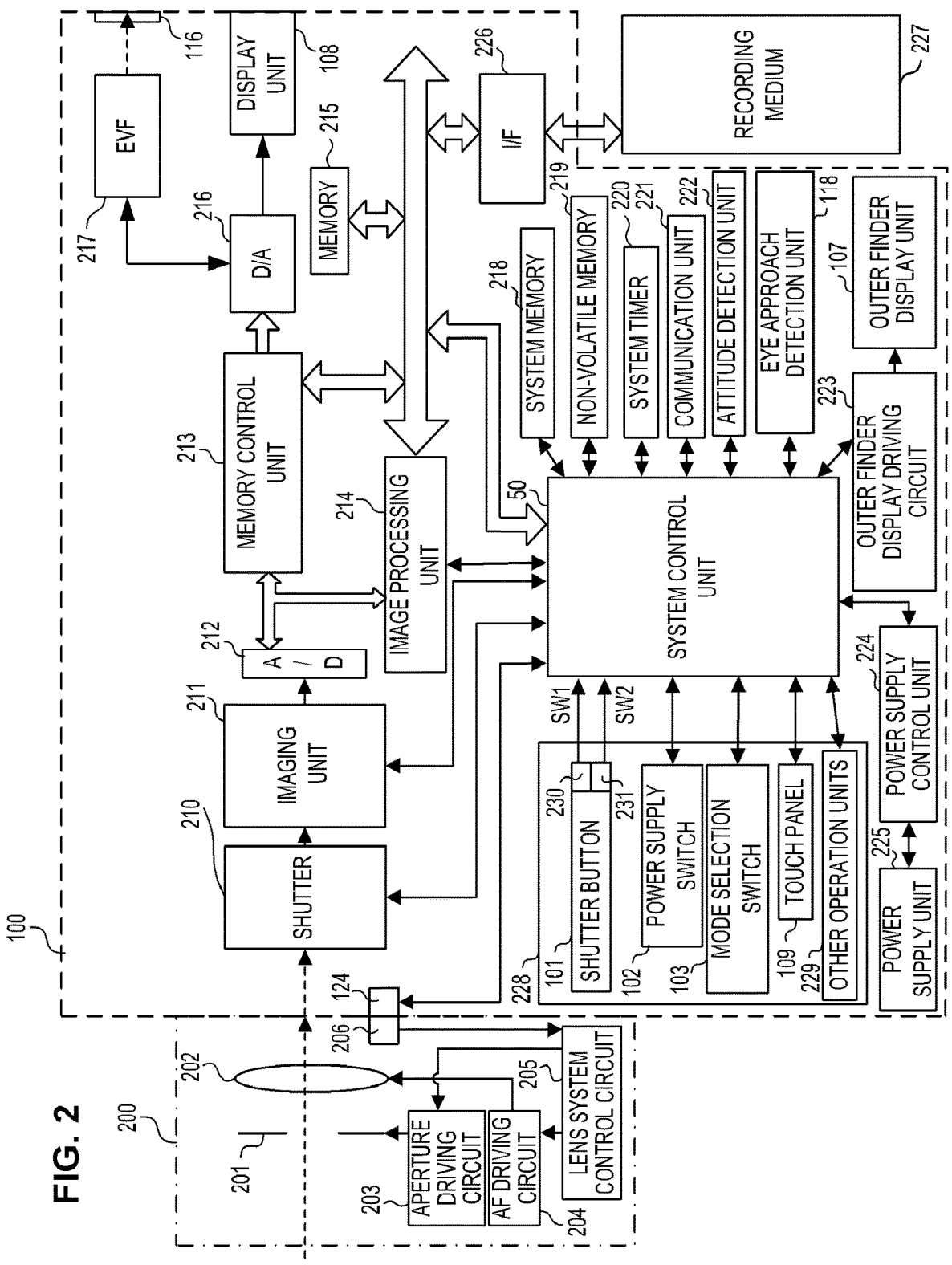
FIG. 2 is an internal block diagram of the camera according to Embodiment 1.

FIG. 2 is a diagram depicting an example of an internal configuration of the camera 100. A composing element the same as FIGS. 1A and 1B is denoted with a same reference sign, and description thereof will be omitted. In the camera 100, a lens unit 200 is attached.

The lens unit 200 will be described first. The lens unit 200 is a type of interchangeable lens detachable from the camera 100. For example, the lens unit 200 is a single lens, and is an example of a lens normally used. The lens unit 200 includes: an aperture 201, a lens 202, an aperture driving circuit 203, an auto focus (AF) driving circuit 204, a lens system control circuit 205, a communication terminal 206, and the like.

In the aperture 201, an opening diameter is adjustable. The lens 202 is constituted of a plurality of lenses. The aperture driving circuit 203 adjusts the quantity of light by controlling the opening diameter of the aperture 201. The AF driving circuit 204 performs focusing by driving the lens 202. The lens system control circuit 205 controls the aperture driving circuit 203, the AF driving circuit 204, and the like based on the instruction received from the later mentioned system control unit 50.

The lens system control circuit 205 controls the aperture 201 via the aperture driving circuit 203, and performs focusing by changing the position of the lens 202 via the AF driving circuit 204. The lens system control circuit 205 is communicable with the camera 100. Specifically, the lens system control circuit 205 performs communication using the communication terminal 206 of the lens unit 200 and the communication terminal 124 of the camera 100. The communication terminal 206 is a terminal for the lens unit 200 to communicate with the camera 100 side.

The camera 100 will be described next. The camera 100 includes: a shutter 210, an imaging unit 211, an A/D convertor 212, a memory control unit 213, an image processing unit 214, a memory 215, a D/A convertor 216, an EVF 217, the display unit 108, and a system control unit 50.

The shutter 210 is a focal plane shutter. The shutter 210 can freely control the exposure time of the imaging unit 211 based on the instruction received from the system control unit 50. The imaging unit 211 includes an element (e.g., CCD, CMOS element) to convert an optical image into electric signals. The imaging unit 211 is an image pickup element (image sensor). The imaging unit 211 may include an imaging plane phase-difference sensor, which outputs defocus amount information to the system control unit 50. The A/D convertor 212 converts analog signals, which are outputted from the imaging unit 211, into digital signals.

The image processing unit 214 performs predetermined processing (e.g., pixel interpolation, resize processing (e.g., demagnification), color conversion processing) on data (data from the A/D convertor 212, or data from the memory control unit 213). The image processing unit 214 also performs predetermined arithmetic processing using the captured image data. The system control unit 50 performs exposure control and distance measurement control based on the acquired arithmetic operation result. Specifically, a through-the-lens (TTL) type AF processing, auto exposure (AE) processing, pre-flash emission (FE) processing, and the like are performed. Furthermore, the image processing unit 214 performs predetermined arithmetic processing using the captured image data, and performs TTL type auto white balance (AWB) processing based on the acquired arithmetic operation result.

The image data outputted from the A/D convertor 212 is written to the memory 215 via the image processing unit 214 and the memory control unit 213, or the image data outputted from the A/D convertor 212 is written to the memory 215 via the memory control unit 213 alone (without using the image processing unit 214). The memory 215 stores image data, which is acquired by the imaging unit 211, and is then converted into digital data by the A/D convertor 212. The memory 215 stores image data to be displayed on the display unit 108 or the EVF 217. The memory 215 has a storage capacity that is sufficient for storing a predetermined number of still images, or a predetermined duration of moving images or sound. The memory 215 also plays a role of memory for displaying images (video memory).

The D/A convertor 216 converts data for displaying images, stored in the memory 215, into analog signals, and supplies the analog signals to the display unit 108 and the EVF 217. Thus data for displaying, written in the memory 215, is supplied to the display unit 108 and the EVF 217 via the D/A convertor 216. The display unit 108 and the EVF 217 perform display in accordance with the analog signals from the D/A convertor 216. The display unit 108 and the EVF 217 are such displays as LCD or organic EL. The digital signals which were A/D-converted by the A/D convertor 212 and stored in the memory 215 are converted into analog signals by the D/A convertor 216. Then the analog signals are sequentially transferred to the display unit 108 and/or the EVF 217, so as to be displayed on the display unit 108 and/or the EVF 217. Thereby live view display is performed.

The system control unit 50 is a control unit constituted of at least one processor and/or at least one circuit. In other words, the system control unit 50 may be a processor, a circuit, or a combination of a processor and a circuit.

The system control unit 50 controls a camera 100 in general. The system control unit 50 implements each processing step of the later mentioned flow chart by executing programs recorded in the non-volatile memory 219. The system control unit 50 also performs display control by controlling the memory 215, the D/A convertor 216, the display unit 108, the EVF 217, and the like.

The camera 100 also includes a system memory 218, a non-volatile memory 219, a system timer 220, a communication unit 221, an attitude detection unit 222, and the eye approach detection unit 118.

For the system memory 218, a RAM, for example, is used. In the system memory 218, constants and variables for operating the system control unit 50, programs read from the non-volatile memory 219, and the like, are developed.

The non-volatile memory 219 is an electrically erasable/recordable memory. For the non-volatile memory 219, an EEPROM, for example, is used. In the non-volatile memory 219, constants, programs and the like, for operating the system control unit 50, are recorded. Here "programs" refers to the programs for executing the later mentioned flow chart. The system timer 220 is a timer unit to measure the time used for various controls, and to measure the time of the internal clock.

The communication unit 221 performs transmission/reception of video signals or audio signals with an eternal device connected wirelessly or via cable. The communication unit 221 is also connectable to a wireless local area network (LAN) or Internet. Further, the communication unit 221 is communicable with an external device via Bluetooth® or Bluetooth Low Energy. The communication unit 221 can send an image (including a live image) captured by the imaging unit 211, or an image recorded in the recording medium 227. The communication unit 221 can receive image data or various other information from an external device.

An attitude detection unit 222 detects an attitude of the camera 100 with respect to the gravity direction. On the basis of the attitude detected by the attitude detection unit 222, it can be determined whether "the image captured by the imaging unit 211 is an image captured by the camera 100 held horizontally, or an image captured by the camera 100 held vertically". The system control unit 50 can attach orientation information, in accordance with the attitude detected by the attitude detection unit 222, to an image file of an image captured by the imaging unit 211. The system control unit 50 can also rotate an image in accordance with the attitude detected by the attitude detection unit 222, and then record the rotated image. For the attitude detection unit 222, an acceleration sensor or a gyro sensor, for example, can be used. By using the attitude detection unit 222, a movement of the camera 100 (e.g., pan, tilt, lift, remain still) can also be detected.

The eye approach detection unit 118 can detect the approach of an object to the eyepiece unit 116 of the eyepiece finder 117 including the EVF 217. For the eye approach detection unit 118, an infrared proximity sensor, for example, can be used. In the case where an object approaches, an infrared light emitted from a light-emitting portion of the eye approach detection unit 118 is reflected by the object, and is received by a light-receiving portion of the infrared proximity sensor. The distance from the eyepiece unit 116 to the object can be determined by the amount of the received infrared light. In this way, the eye approach detection unit 118 can perform eye approach detection to detect the proximity distance from the object to the eyepiece unit 116. The eye approach detection unit 118 is an eye approach detection sensor to detect the approach (eye contact) and the separation (eye release) of the eye (object) to/from the eyepiece unit 116 of the eyepiece finder 117.

In a case where the approach of an object to the eyepiece unit 116 at a predetermined distance or less is detected from the non-eye contact state (non-eye approaching state), the eye approach detection unit 118 detects the approach of the eye. In a case where separation of the object, of which eye approach was detected, from the eyepiece unit 116 at a predetermined distance or more, is detected from the eye contact state (eye approaching state), the eye approach detection unit 118 detects the separation of the eye. A threshold to detect the eye contact and a threshold to detect the eye separation may be different (by setting hysteresis, for example). After detecting the eye contact, it is assumed that the eye contact state continues until the eye separation is detected. After detecting the eye separation, it is assumed that the non-eye contact state continues until the eye contact is detected.

The system control unit 50 switches the display (display state)/non-display (non-display state) of the display unit 108 and the EVF 217 in accordance with the state detected by the eye approach detection unit 118. Specifically, in the case where the camera 100 is at least in the image capturing standby state and switching of the display destination is set to automatic switching, the display unit 108 is ON as the display destination during the non-eye contact state, where the EVF 217 is in the non-display state. During the eye contact state, the EVF 217 is ON as the display destination, where the display unit 108 is in the non-display state. The eye approach detection unit 118 is not limited to the infrared proximity sensor, but may be a different sensor if the sensor can detect a state regarded as eye contact.

The camera 100 also includes: the outer finder display unit 107, an outer finder display driving circuit 223, a power supply control unit 224, a power supply unit 225, a recording medium I/F 226, an operation unit 228, and a video signal output I/F.

The outer finder display unit 107 displays various set values (e.g., shutter speed, aperture) of the camera 100 via the outer finder display driving circuit 223. The power supply control unit 224 includes a battery detection circuit, a DC-DC convertor, a switch circuit (a circuit to select a block to be energized), and the like. The power supply control unit 224 detects whether a battery is installed or not, a type of battery, and a residual amount of battery. The power supply control unit 224 also controls the DC-DC convertor based on this detection result and the instructions received from the system control unit 50, and supplies the required voltage to each portion (including the recording medium 227) for a required period of time.

The power supply unit 225 is constituted of a primary battery (e.g., alkali battery, lithium battery), a secondary battery (e.g., NiCd battery, NiMH battery, Li battery), an AC adaptor, and the like. The recording medium I/F 226 is an interface with the recording medium 227 (e.g., memory card, hard disk). The recording medium 227 is a memory card to record captured images. The recording medium 227 includes a semiconductor memory, a magnetic disk, or the like. The recording medium 227 may be detachable from the camera 100, or may be embedded in the camera 100.

The operation unit 228 is an input unit (operation member) to receive an operation (user operation) from the user. The operation unit 228 is used to input various operation instructions to the system control unit 50. The operation unit 228 includes: the shutter button 101, the power supply switch 102, the mode selection switch 103, the touch panel 109, and other operation units 229. The other operation unit 229 includes: the main electronic dial 104, the sub-electronic dial 105, the video button 106, the direction key 110, the SET button 111, the AE lock button 112, the magnifying button 113, the reproduction button 114, the menu button 115, the touch bar 119, and the like.

The shutter button 101 includes a first shutter switch 230 and a second shutter switch 231. The first shutter switch 230 turns ON in mid-operation of the shutter button 101, that is, in the half-depressed state (image capturing preparation instruction), and generates a first shutter switch signal SW1. By the generation of the first shutter switch signal SW1, the system control unit 50 starts such image capturing preparation operations as the AF processing, the AE processing, the AWB processing or the EF processing. The second shutter switch 231 turns ON when operation of the shutter button 101 is completed, that is, in the fully depressed state (image capturing instruction), and generates a second shutter switch signal SW2. When the second shutter switch signal SW2 is generated, the system control unit 50 starts a series of image capturing processing (from a step of reading signals from the imaging unit 211 to a step of generating the image file, including the captured image, and writing the image file in the recording medium 227).

The mode selection switch 103 switches the operation mode of the system control unit 50 to one of: a still image capturing mode, a moving image capturing mode, a reproduction mode, and the like. The still image capturing mode includes: an auto image capturing mode, an auto scene determining mode, a manual mode, an aperture priority mode (Av mode), a shutter speed priority mode (Tv mode), and a program AE mode (P mode). The modes included in the still image capturing mode are various scene modes, in which an image capturing setting is performed depending on the image capturing scene and a custom mode. The user can directly switch to one of the above mentioned image capturing modes using the mode selection switch 103. The user may also select an image capturing mode list screen first using the mode selection switch 103, then select one of a plurality of modes displayed thereon, using the operation unit 228. In the same manner, the moving image capturing mode may include a plurality of modes.

The touch panel 109 is a touch sensor that detects various touch operations on the display surface (operation surface of the touch panel 109) of the display unit 108. The touch panel 109 and the display unit 108 can be integrated. For example, the touch panel 109 is installed on an upper layer of the display surface of the display unit 108, such that the transmission of the light emitted from the display unit 108 is not interrupted (such that the transmission of light does not interrupt the display unit 108). Then the input coordinates on the touch panel 109 and the display coordinates on the display surface of the display unit 108 are corresponded.

Thereby a graphical user interface (GUI), as if the user can directly operate the screen displayed on the display unit 108, can be provided.

The touch panel 109 may be any one of various types, such as a resistive film type, an electrostatic capacitive type, a surface acoustic wave type, an infrared type, an electromagnetic induction type, an image recognition type, and a photosensor type. Some types detect touch when the touch panel 109 is actually contacted, while other types detect touch when a finger or pen approaches the touch panel 109, but either type may be used.

The system control unit 50 can detect the following operations or states on the touch panel 109.

a finger or a pen which does not touch the touch panel 109 initially touches the touch panel 109, that is, the start of touch (hereafter Touch-Down)

a finger or a pen is touching the touch panel 109 (hereafter Touch-On)

a finger or a pen is moving on the touch panel 109 in the touched state (hereafter Touch-Move)

a finger or a pen touching the touch panel 109 is separated (released) from the touch panel 109, that is, the end of touch (hereafter Touch-Up)

Nothing is touching the touch panel 109 (hereafter Touch-Off)

When Touch-Down is detected, Touch-On is detected simultaneously. Unless Touch-Up is detected after Touch-Down, Touch-On is normally detected continuously. When Touch-Move is detected as well, Touch-On is detected simultaneously. Even if Touch-On is detected, Touch-Move is not detected unless the touch position is moving. When Touch-Up of a finger and a pen is detected, Touch-Off is detected.

These operations/states and coordinates of the positions on the touch panel 109, where a finger or a pen is touching, are notified to the system control unit 50 via an internal bus. On the basis of the notified information, the system control unit 50 determines which operation (touch operation) was performed on the touch panel 109. For Touch-Move, the moving direction of a finger or a pen moving on the touch panel 109 can also be determined on the basis of the change in the positional coordinates, for the vertical component and the horizontal component on the touch panel 109 respectively. In the case where Touch-Move, for a predetermined distance or more, is detected, the system control unit 50 determines that the slide operation was performed. An operation of quickly moving a fingertip touching the touch panel 109 and releasing the fingertip from the touch panel 109 is called a "flick". That is, flick is an operation of quickly moving (flicking) a fingertip on the touch panel 109. In a case where Touch-Move, for a predetermined distance or more and a predetermined speed or faster, is detected and Touch-Up is detected thereafter, it is determined that flick was performed (it is determined that flick occurred immediately after the slide operation). A touch operation of touching a plurality of locations (e.g., two points) simultaneously and moving these touch positions close to each other is called a "Pinch-In", and the touch operation of moving these touch positions away from each other is called a "Pinch-Out". Pinch-In and Pinch-Out are collectively called a "pinch operation" (or simply "pinch").

Figure 3:
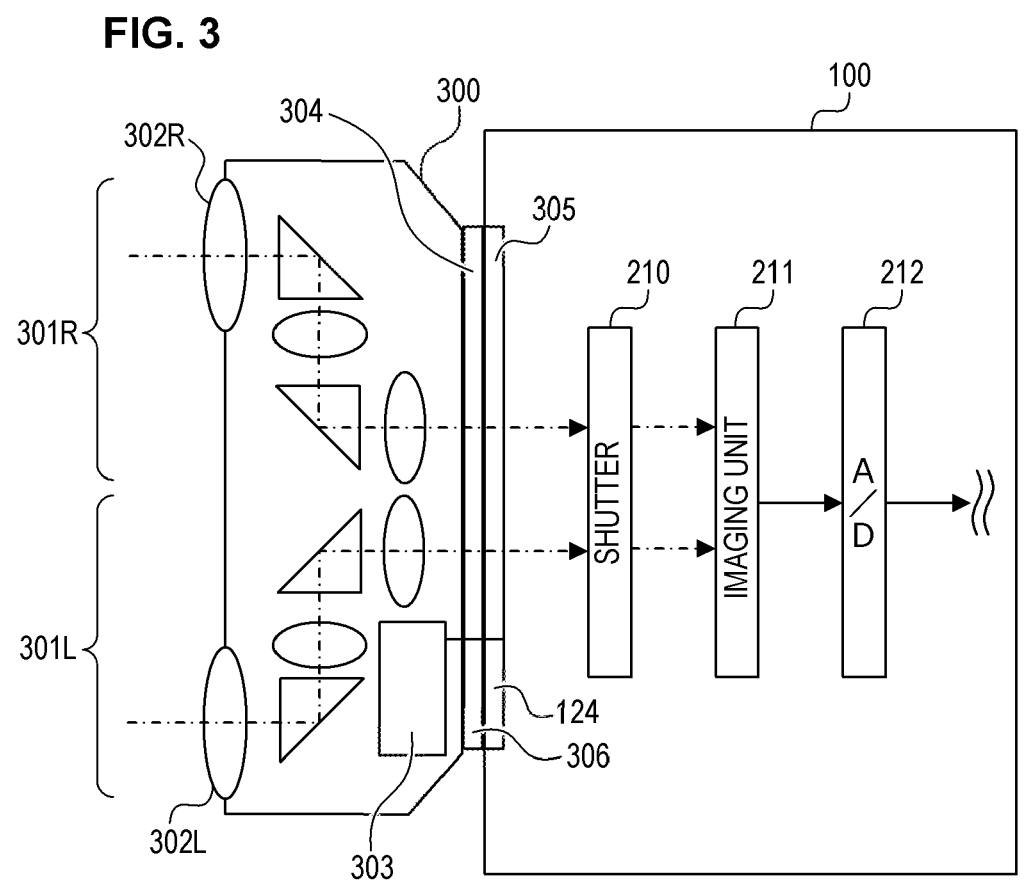
Figure 6A:
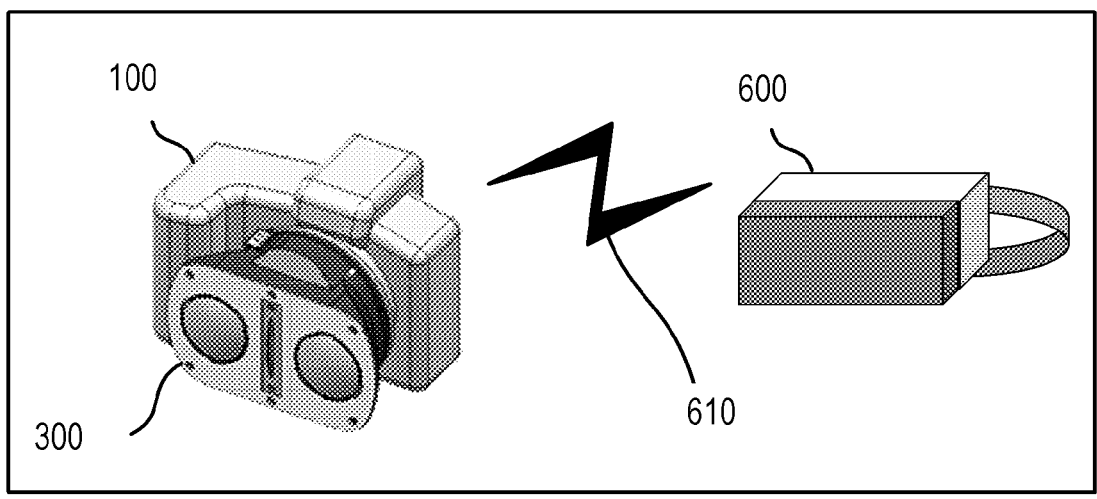
FIGS. 6A and 6B are diagrams depicting a system configuration according to Embodiment 2.

FIG. 3 is a schematic diagram depicting an example of a configuration of a lens unit 300. FIG. 6A indicates a state where the lens unit 300 is attached to the camera 100.

The lens unit 300 is a type of interchangeable lens that is detachable from the camera 100. The lens unit 300 is a dual lens which enables capturing a left image and a right image which have parallax. The lens unit 300 includes two optical systems, each of which has an approximately 180° wide field-of-view, and can capture an image in a range of a front hemisphere. Specifically, each of the two optical systems of the lens unit 300 can capture an image of a subject in a field of view (angle of view) of 180° in the lateral direction (horizontal direction, azimuth angle, yaw angle), and 180° in the longitudinal direction (vertical angle, elevation/depression angle, pitch angle).

The lens unit 300 includes a right eye optical system 301R and a left eye optical system 301L, and a lens system control circuit 303. Each of the right eye optical system 301R and the left eye optical system 301L has a plurality of lenses, a reflection mirror, and the like. The right eye optical system 301R corresponds to an example of the first optical system, and the left eye optical system 301L corresponds to an example of the second optical system. A lens 302R located on the subject side of the right eye optical system 301R, and a lens 302L located on the subject side of the left eye optical system 301L face the same direction. The optical axes of the two lenses 302R and 302L are approximately parallel.

The lens unit 300 of Embodiment 1 is a VR180 lens (lens for capturing an image for VR180, which is a format of a VR image allowing binocular stereoscopic viewing). In the VR180 lens, each of the right eye optical system 301R and the left eye optical system 301L includes a fisheye lens which can capture an approximately 180° range. However, as long as each of the right eye optical system 301R and the left eye optical system 301L can capture an image which allows such a binocular VR display as VR180, the VR180 lens may be a lens that can capture a 160° range of an angle-of-view, which is narrower than the 180° range. The VR180 lens can form a right image (first image) that is formed using the right eye optical system 301R, and the left image (second image) that is formed using the left eye optical system 301L, having parallax with the right image, on one or two image pickup elements of the camera to which this VR180 lens is attached.

The lens unit 300 is attached to the camera 100 via a lens mount unit 304 and a camera mount unit 305 of the camera 100. Thereby the system control unit 50 of the camera 100 and the lens system control circuit 303 of the lens unit 300 are electrically connected via the communication terminal 124 of the camera 100 and a communication terminal 306 of the lens unit 300.

In Embodiment 1, the right image that is formed via the right eye optical system 301R and the left image that is formed via the left eye optical system 301L having parallax with the right image are formed on the imaging unit 211 of the camera 100 side-by-side. In other words, two optical images, formed by the right eye optical system 301R and the left eye optical system 301L, are formed on one image pickup element. The imaging unit 211 converts the formed subject image (optical signals) into analog electric signals. By using the lens unit 300 in this way, two images having parallax can be simultaneously acquired (as a set) from two locations (optical systems) of the right eye optical system 301R and the left eye optical system 301L. Furthermore, the acquired image is VR-displayed separately as an image for the left eye and an image for the right eye, whereby the user can view an approximately 180° range of a stereoscopic VR image (that is, VR180).

The VR image here refers to an image that can be VR-displayed, as mentioned later. The VR image includes an omnidirectional image captured by an omnidirectional camera, and a panoramic image having an image range (effective image range) that is wider than the display range that the display unit can display all at once. A VR image is not limited to a still image, but includes a moving image and a live image (image acquired from a camera in near real-time). The VR image has a field-of-view of an image range (effective image range) that is 360° in the lateral direction, and 360° in the longitudinal direction at the maximum. The VR image also includes an image having an angle-of-view that is wider than the angle-of-view that a standard camera can capture, or an image having an image range that is wider than the display range that the display unit can display all at once, even if the image range is less than 360° in the lateral direction and less than 360° in the longitudinal direction. An image captured by the camera 100 using the above mentioned lens unit 300 is a type of VR image. The VR image can be VR-displayed by setting the display mode of a display device (display device that can display a VR image) to "VR view", for example. By VR-displaying a VR image having a 360° angle-of-view and the user changing the attitude of the display device in the left-right directions (horizontal rotating directions), an omnidirectional image that is seamless in the left-right direction can be viewed.

The VR display (VR view) here refers to a display method (display mode) in which the display range is changeable so that an image in a field-of-view range in accordance with the attitude of the display device, among the VR images, is displayed. The VR display includes "monocular VR display (monocular VR view)" that performs deformation to map the VR image onto a virtual sphere (deformation to correct distortion) so as to display one image. The VR display also includes "binocular VR display (binocular VR view)" that performs deformation to map the VR image for the left eye and the VR image for the right eye onto virtual spheres respectively, so as to display these image on the left and right regions side-by-side. By performing "binocular VR display" using the VR image for the left eye and the VR image for the right eye having parallax with each other, a stereoscopic viewing becomes possible. In either of the VR display methods, if the user wears such a display device as a head mounted display (HMD), for example, an image in the visual field range in accordance with the direction of the face of the user is displayed. For example, in the VR image, it is assumed that an image in a visual field range centering at 0° in the lateral direction (specific azimuth, such as North) and 90° in the longitudinal direction (90° from zenith, that is, horizontal line) is displayed at a certain timing. If the attitude of the display device is front/back reversed in this state (e.g. display surface is changed from facing South to facing North), the display range in the same VR image is changed to an image in a visual field range centering at 180° in the lateral direction (opposite zenith, such as South) and 90° in the longitudinal direction. In other words, when the user turns their face from North to South (that is, turns back) in the state of wearing an HMD, the image is displayed on the HMD also changes from the image of the North to the image of the South. The VR image captured using the lens unit 300 of Embodiment 1 is a VR180 image capturing an approximately 180° range to the front, where an image in an approximately 180° range to the back does not exist. In the case where this VR180 image is VR-displayed and the attitude of the display device is changed to the side where the image does not exist, a blank region is displayed.

By VR-displaying the VR image in this way, the user visually has the sensation as if they are inside of the VR image (inside of the VR space). The display method of the VR image is not limited to the method of changing the attitude of the display device. For example, the display range may be moved (scrolled) in accordance with the user operation via the touch panel, the direction button, or the like. Further, in the VR display time (when the display mode is "VR view"), the display range may be changed by Touch-Move on the touch panel, a dragging operation with the mouse, pressing a direction button, or the like, in addition to the change of the display range by changing the attitude. A smartphone installed on the VR goggles (head mounted adaptor) is a type of HMD.

Processing by the camera 100 according to Embodiment 1 (information processing; information processing method) will be described next with reference to the flow chart in FIG. 4. In the flow chart in FIG. 4, the camera 100 acquires information on blur caused by the camera 100 (e.g., degree of camera shake during image capturing), as the information related to a phenomenon that causes VR sickness (hereafter called "phenomenon information").

Figure 4:
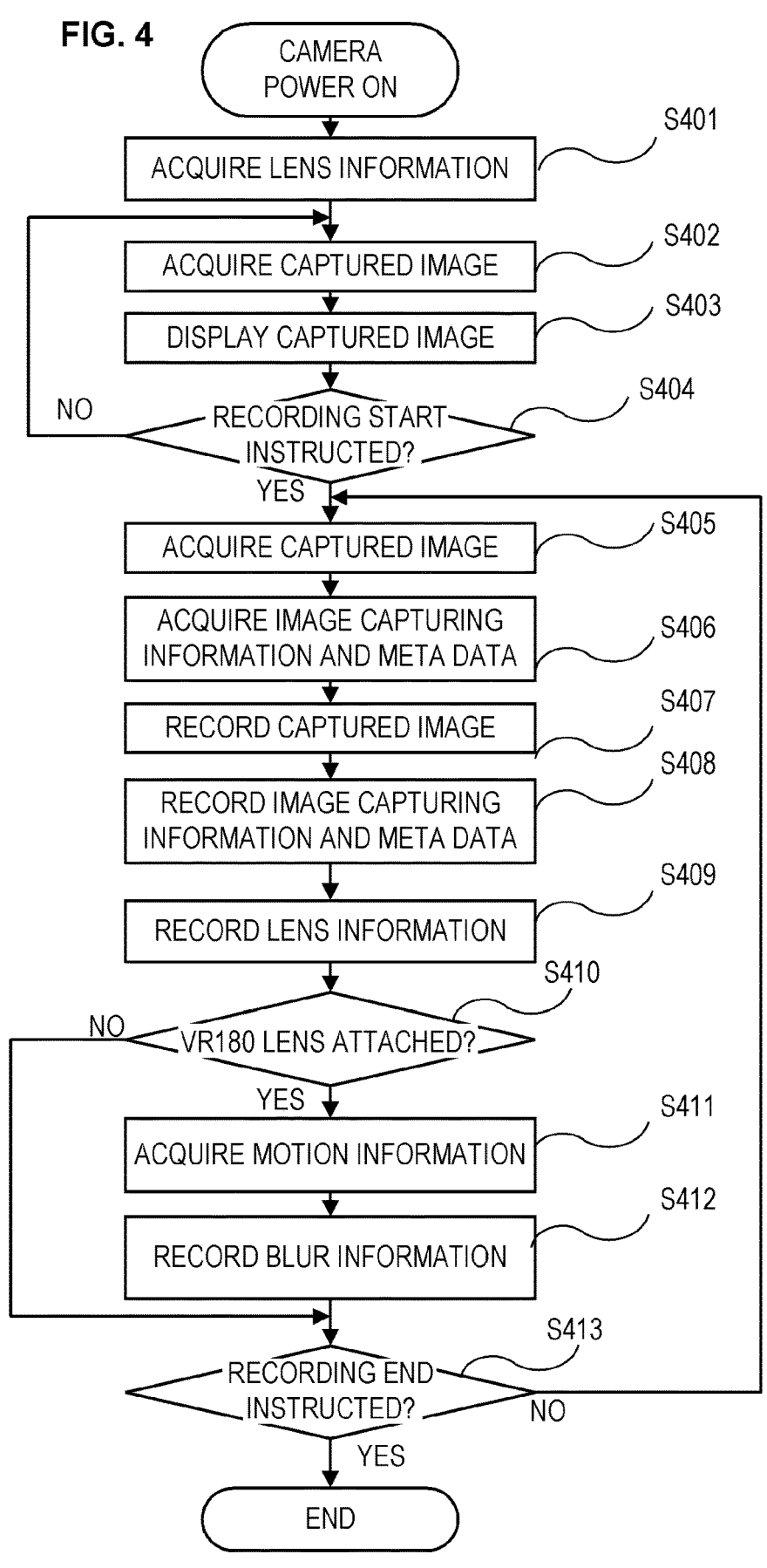
FIG. 4 is a flow chart of processing of the camera according to Embodiment 1.

In the flow chart in FIG. 4, processing starts when a user (hereafter called an "operator") who operates the camera 100 turns the power supply of the camera 100 ON.

In step S401, the system control unit 50 acquires information on a lens (attached lens) which is attached to the camera 100 (e.g., set values, individual values). Hereafter the information on the attached lens is called "lens information".

In step S402, the system control unit 50 acquires a captured image (acquires an image) from the imaging unit 211. Here the captured image acquired by the camera 100 to which the VR180 lens is attached includes a right eye image for the right eye and a left eye image for the left eye of the user.

In step S403, the system control unit 50 displays the captured image acquired in step S402 on the EVF 217.

In step S404, the system control unit 50 determines whether the operator instructed the start of recording (instruction to start recording of captured image) by operating the shutter button 101. Processing advances to step S405 if it is determined that the start of recording is instructed. Processing returns to step S402 if it is determined that the start of recording is not instructed. In this case, the live view display is repeated on the EVF 217 until the start of recording is instructed.

The processing steps S405 to S412 are executed for the captured image currently acquired by imaging of the imaging unit 211 (camera 100). In other words, the processing steps S405 to S412 are executed for each captured image (for each frame of a moving image).

In step S405, the system control unit 50 acquires the captured image (currently acquired captured image captured by the imaging unit 211) from the imaging unit 211. When a moving image is captured, the system control unit 50 also acquires sound simultaneously.

In step S406, the system control unit 50 acquires image capturing information (e.g., shutter speed when capturing an image), and meta data indicating information on the camera 100 (e.g., camera name, lens name). When a RAW image is captured, the meta data includes information required for development.

In step S407, the system control unit 50 records the captured image acquired in step S405 in a file (recording region). When a moving image is captured, the system control unit 50 also records sound in the file simultaneously. The file is stored in the recording medium 227, for example.

In step S408, the system control unit 50 records the image capturing information and the meta data acquired in step S406 in the file. In Embodiment 1, the system control unit 50 records the image capturing information and the meta data in the same file as the captured image.

In step S409, the system control unit 50 records the lens information acquired in step S401 in the file. In Embodiment 1, the system control unit 50 records the lens information in the same file as the captured image.

Thus in steps S407 to S409, the captured image, the image capturing information, the meta data and the lens information are recorded in the same file. Therefore the captured image, the image capturing information, the meta data and the lens information are associated with (corresponding to) each other, and are recorded in this state (see FIG. 5).

In step S410, the system control unit 50 determines whether or not the attached lens is the VR180 lens (dual lens) (whether or not the captured image is an image captured by the camera 100 to which the VR180 lens is attached). Processing advances to step S411 if it is determined that the attached lens is the VR180 lens. Processing advances to step S413 if it is determined that the attached lens is not the VR180 lens.

In step S411, the system control unit 50 acquires information on the motion of the camera 100 (motion information) from the attitude detection unit 222. Specifically, as the motion information, the system control unit 50 acquires a change amount of the current attitude of the camera 100 from the attitude of the camera 100 one frame ago, using an acceleration sensor or the like.

In step S412, the system control unit 50 converts the motion information of the camera 100 into information (blur information) on the degree of blur (phenomenon level), and records the blur information in the file. As mentioned above, the blur information is information on phenomenon (phenomenon information) that possibly cause VR sickness. In Embodiment 1, the system control unit 50 records the blur information in the same file as the captured image in the state of associating the blur information with the captured image. If the attached lens is not the VR180 lens (dual lens), the system control unit 50 does not record the blur information in the file.

The blur information may be recorded such that the degree of blur is indicated by one of: "large", "intermediate", "small" and "none", in accordance with the magnitude of the motion information acquired in step S411, for example. The degree of blur may also be expressed by a numeric value, such as 10 if the degree of blur is large, and 0 if there is no blur. Further, the system control unit 50 may record the motion information (change amount of the attitude of the camera 100) directly in the file, then another device, which handles the file, may convert this motion information into the blur information.

Figure 5:
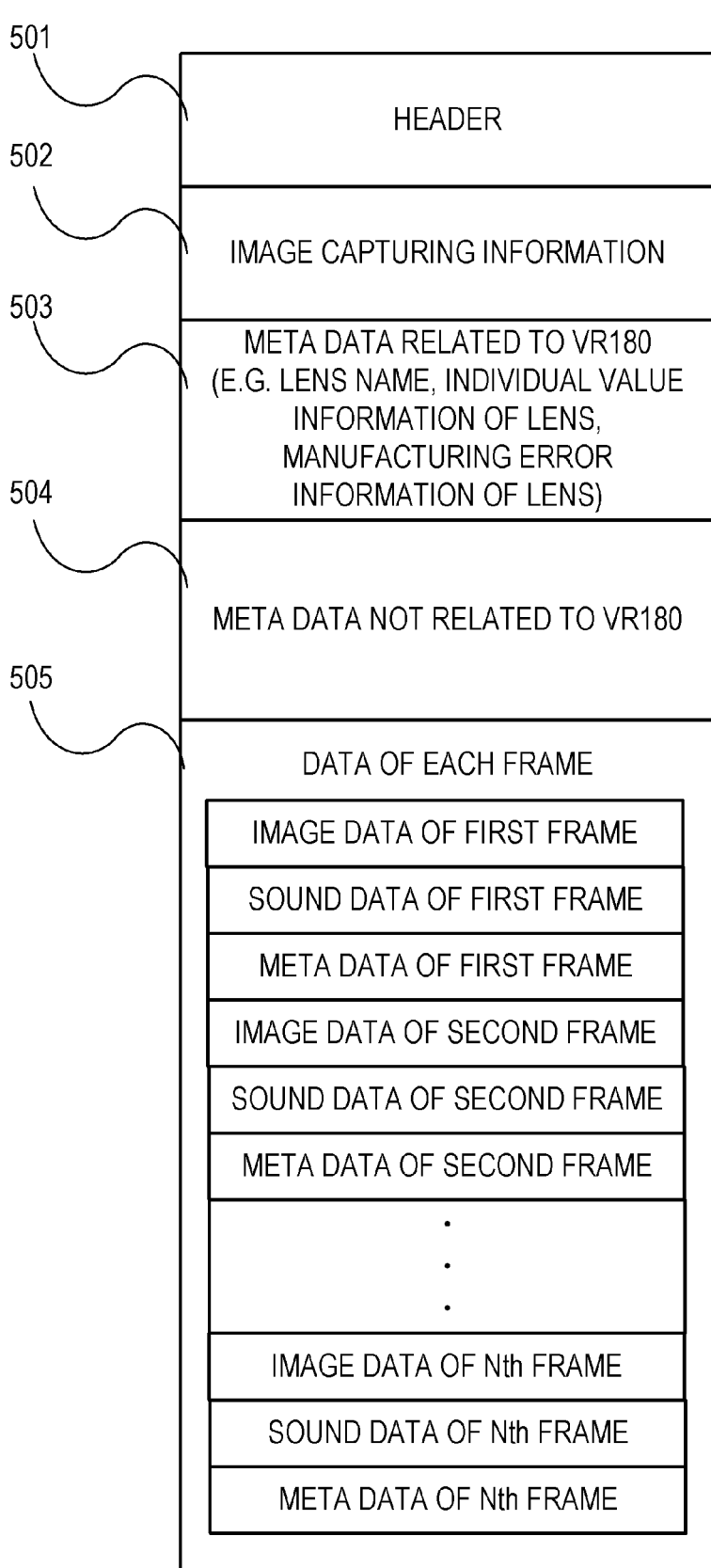
FIG. 5 is a diagram of a data configuration of a moving image file according to Embodiment 1.

FIG. 5 indicates an example of an internal data configuration of a file (moving image file) to record a captured image, and the like. The moving image file is stored in the memory 215, the recording medium 227, or the like. The moving image file includes: a header 501 where such information as a file format is stored; image capturing information 502; meta data 503 related to the VR180; meta data 504 not related to the VR180; and data 505 for each frame of the moving image.

The meta data 503 includes information (e.g., lens name, individual value of lens) only in a case where the VR180 is attached to the camera 100. The data 505 includes the captured image (image data), sound (sound data) and meta data for each frame. The blur information is recorded in the meta data of the data 505 of each frame. Various data are recorded in the moving image file, so that a frame having a high degree of blur can be recognized thereby.

In step S413, the system control unit 50 determines whether the operator instructed for the end of the recording (instruction to end the recording of the captured image is performed). In Embodiment 1, the operator of the camera 100 instructs for the end of the recording by pressing the shutter button 101 again. The processing of this flow chart ends if it is determined that the end of the recording is instructed. Processing advances to step S405 if it is determined that the end of the recording is not instructed. In this case, the processing steps S405 to S412 are repeated, whereby the captured images (image of each frame of the moving image) can be sequentially recorded in the file.

In step S412, the system control unit 50 may acquire arbitrary phenomenon information. For example, the system control unit 50 may detect a difference between the left eye image and the right eye image (image magnification difference, vertical deviation, rotational deviation, brightness difference, contrast difference, color difference, or the like) as the phenomenon information (as a phenomenon that possibly cause the VR sickness) by controlling the image processing unit 214. The difference between the left eye image and the right eye image can be detected using a commonly used image processing. For example, the image processing unit 214 can acquire a brightness difference between the two images by comparing the average brightness in a predetermined region of the left eye image and the average brightness in a predetermined region of the right eye image.

Immediately after the end of the processing of the flow chart in FIG. 4 (immediately after the end of recording the moving image), the system control unit 50 may record summary information in the meta data 503, based on the blur information (phenomenon information) of the meta data of each frame. The summary information is summary information of the level of the phenomenon that possibly cause the VR sickness (hereafter called "phenomenon level"), for example. The summary information includes information on the maximum value of the phenomenon level (degree of blur), or information on a block where the phenomenon level is high. Thereby the display device, which received the moving image file, can quickly acquire the information on the phenomenon level of the cause of the VR sickness, and a block which may be causing the VR sickness, from the moving image file when the captured image is displayed.

In step S412, if it is determined that the phenomenon level (degree of blur) is a predetermined level or more, the system control unit 50 may output a warning (notification) to the operator to acquire a new moving image (captured image) again. In this case, the system control unit 50 outputs this warning during or immediately after the recording of the moving image.

In the case of displaying a list of thumbnails of a plurality of moving images, the system control unit 50 may superimpose an icon, which indicates a level of VR sickness of which may be the cause of the VR sickness (e.g. "VR sickness: High" or "VR sickness: Low"), on each thumbnail. Thereby the operator can visually recognize a moving image at a glance, which may easily cause the VR sickness. The level which may cause VR sickness is interrelated with the phenomenon information (such information as degree of blur and degree of difference between the right eye image and the left eye image). Therefore the system control unit 50 can determine the level which may cause VR sickness based on the phenomenon information. Further, the system control unit 50 may display details of the phenomenon information (e.g., type of phenomenon which may cause the VR sickness, phenomenon level, and the block which may be causing the VR sickness), as displaying image capturing information of the moving image on the camera 100.

In some cases, by pressing the shutter button 101, blur may be generated immediately after the start of the recording of the moving image, and immediately before the end of the recording of the moving image. Hence, the system control unit 50 may control to not record the moving image immediately after instructing the start of the recording of the moving image, and immediately before instructing the end of the recording of the moving image.

In Embodiment 1, the meta data is recorded in the moving image file, but may be stored in a different file (sidecar file) related to (corresponding to) the moving image file.

In this flow chart, a moving image (video) was described, but a still image may be used instead of a moving image. In this case, only the captured image in the first frame and the meta data in the first frame are recorded in the data 505 for each frame, as indicated in FIG. 5.

The captured image may be recorded in a RAW moving image format or a RAW still image format, instead of the commonly used MP4 moving image format or JPEG still image format.

As described above in Embodiment 1, when an image is captured, the camera records information on camera blur or information on the difference between the left eye image and the right eye image (e.g. brightness difference, contrast difference, color difference) is recorded in a file (recording medium) as the phenomenon information. Thereby the display device, which displays a moving image of a VR image, can read the phenomenon information, together with the captured image, from the file, and can appropriately determine, on the basis of the phenomenon information, whether the phenomenon may cause the VR sickness to the user. Therefore the display device can appropriately control display of the moving image (captured image) based on the phenomenon information. As a consequence, the occurrence of VR sickness to the user when viewing the moving image can be prevented.

Embodiment 2

A system according to Embodiment 2 includes a camera to which a dual lens (VR180 lens) is attached, and an HMD which displays a moving image file recorded by this camera. In Embodiment 2, the HMD determines whether the recorded moving image file was recorded in the state where the VR180 lens is attached to the camera. Then if it is determined that the recorded moving image file was recorded in the state where the VR180 lens is attached to the camera, the HMD controls the display state of the moving image (captured image) based on the phenomenon information in the moving image file. In Embodiment 2, a composing element denoted with a same reference sign as Embodiment 1 performs the same operation or processing as Embodiment 1, hence description thereof will be omitted.

Figure 6B:
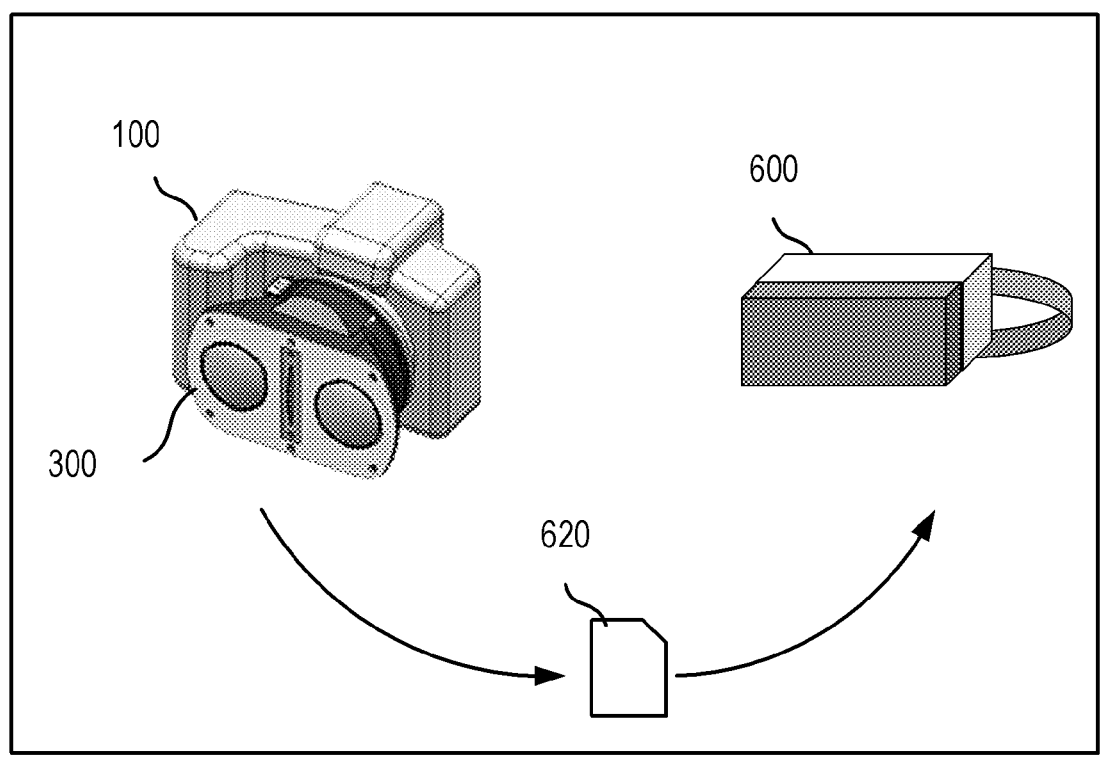

FIGS. 6A and 6B are diagrams depicting a system configuration of the camera 100 and an HMD 600 according to Embodiment 2. In FIGS. 6A and 6B, configurations of the camera 100 and the lens unit 300 (VR180 lens) are the same as Embodiment 1.

FIG. 6A is a system configuration where the camera 100 and the HMD 600 according to Embodiment 2 are connected to communicate with each other. The HMD 600 displays an image (moving image or still image) captured by the camera 100. Communication 610 is a commonly used wireless communication or cable communication.

FIG. 6B is a system configuration where a file 620 recorded by the camera 100 according to Embodiment 2 is provided (outputted) to the HMD 600. The file 620 is a moving image file recorded by the camera 100 (see FIG. 5). The file 620 may be a still image file.

Figure 7:
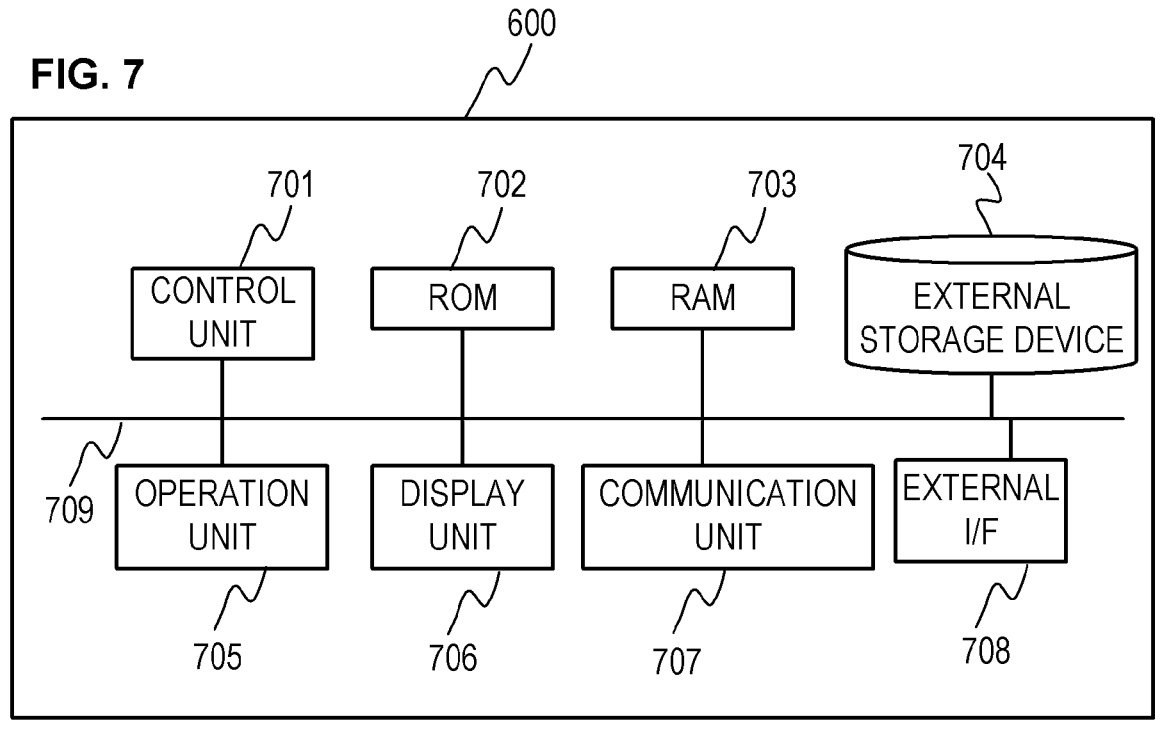
FIG. 7 is a block diagram of an HMD according to Embodiment 2.

FIG. 7 is a block diagram depicting a configuration of the HMD 600. The HMD 600 is a display device (electronic device) which displays a captured image. The HMD 600 includes: a control unit 701, a ROM 702, a RAM 703, an external storage device 704, an operation unit 705, a display unit 706, a communication unit 707, an external interface (I/F) 708, and a system bus 709.

The control unit 701 controls the HMD 600 in general. The control unit 701 is a central processing unit (CPU), for example.

The ROM 702 is a read only memory (ROM) for storing programs and parameters which are not required to change. The ROM 702 stores predetermined information processing programs (program codes which the control unit 701 can read), and the control unit 701 executes these program codes.

The RAM 703 is a random access memory (RAM) which temporarily stores programs and data supplied from an external device or the like.

The external storage device 704 is a hard disk or a flash memory installed inside of the HMD 600. The external storage device 704 also includes a memory card or the like that is detachable from the HMD 600.

The operation unit 705 includes operation members (e.g., buttons) which the user operates. The display unit 706 displays an image. The display unit 706 includes a left eye display unit (display unit for the left eye to view) and a right eye display unit (display unit for the right eye to view).

The communication unit 707 is a communication unit to connect to the camera 100. The external I/F 708 performs the transmission/reception of video signals and files (e.g., moving image files indicated in FIG. 5) with an external device, such as the camera 100. The system bus 709 is a system bus to communicably connect each composing element.

The moving image file recorded by the camera 100 is written in the external storage device 704.

Figure 8:
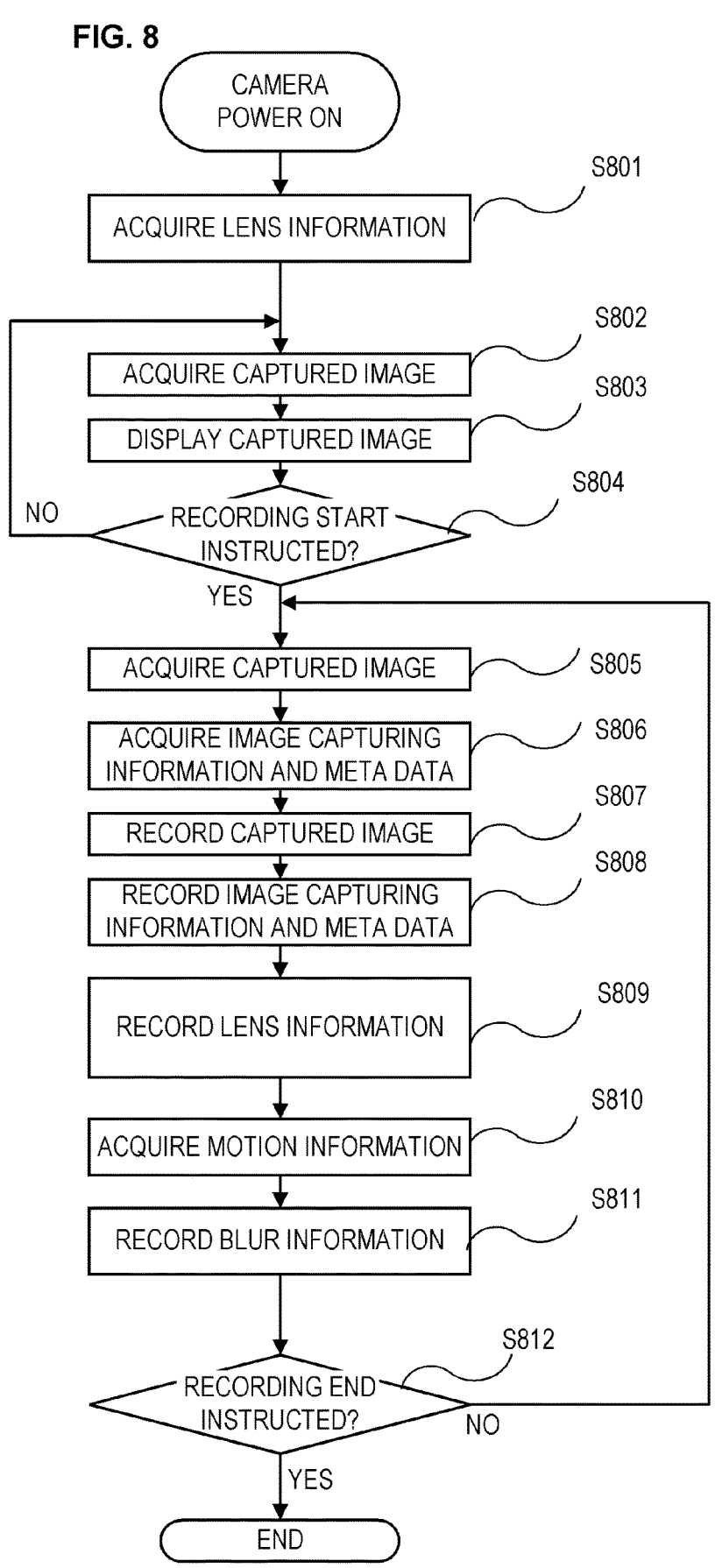
FIG. 8 is a flow chart of processing of the camera according to Embodiment 2.

FIG. 8 is a flow chart of recording a moving image file by the camera 100 according to Embodiment 2. Steps S801 to S809 in FIG. 8 are the same as steps S401 to S409 in FIG. 4. Steps S810 and S811 are the same as steps S411 and S412. Hence description on steps S801 and S811 will be omitted.

In step S812, the system control unit 50 determines whether or not the operator instructed the end of the recording. The processing of this flow chart ends if it is determined that the end of the recording is instructed. Processing advances to step S805 if it is determined that the end of the recording is not instructed.

The operation of the HMD 600 will now be described with reference to the flow chart in FIG. 9. A user who wears the HMD 600 on their head and views a moving image is hereafter called a "viewer".

Figure 9:
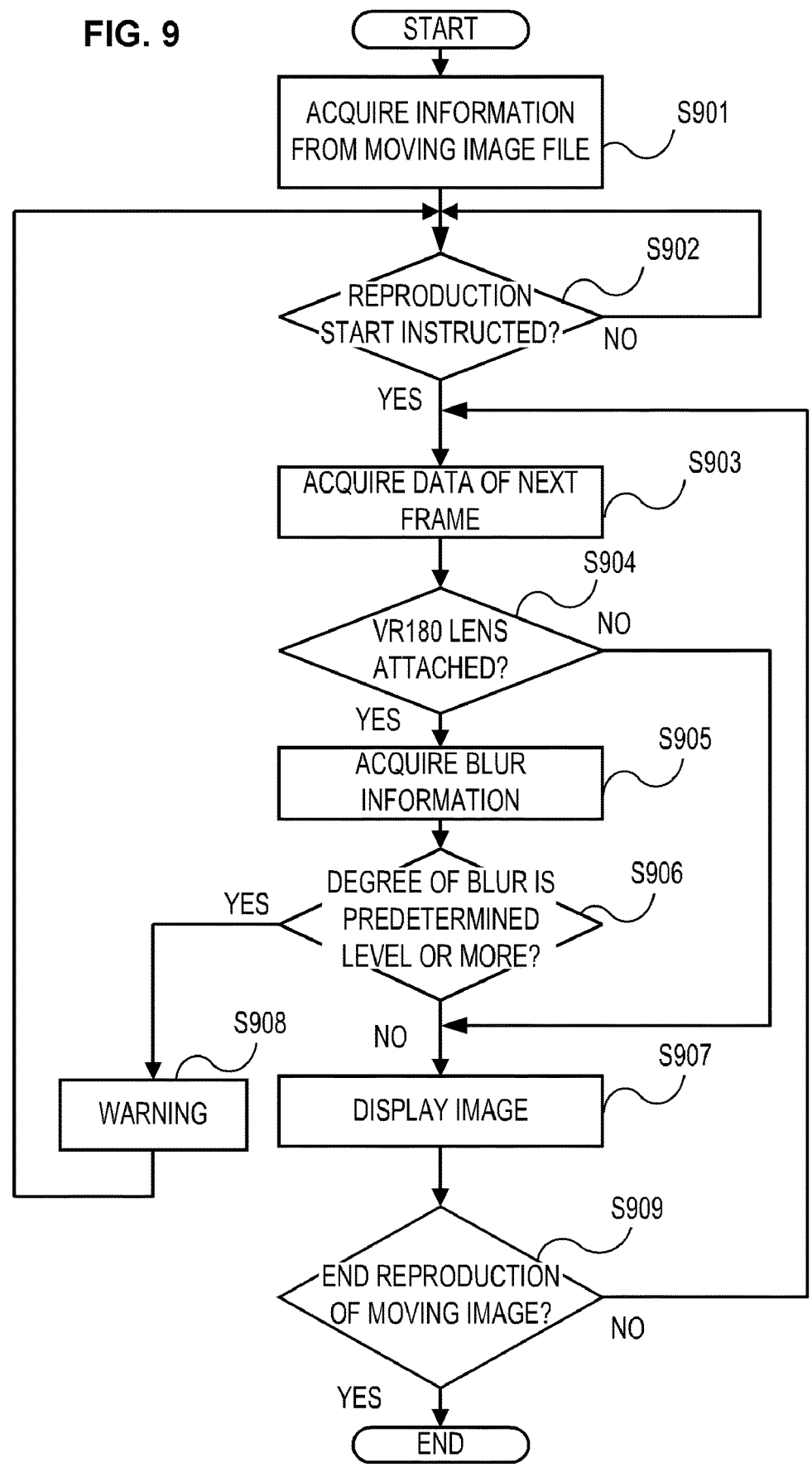
FIG. 9 is a flow chart of processing of the HMD according to Embodiment 2.

In the flow chart in FIG. 9, processing starts when the HMD 600 reads a moving image file (e.g., acquires a moving image file from the camera 100 or the external storage device 704). Using the moving image file which was read, the HMD 600 can perform reproduction display, reproduction start and reproduction stop of the moving image can be performed by a specific application. Here the configuration of the moving image file is the same as the configuration in FIG. 5 according to Embodiment 1. In other words, in the moving image file, a captured image and blur information are associated.

In step S901, the control unit 701 acquires the image capturing information 502, the meta data 503, and the meta data 504 from the moving image file which was read.

In step S902, the control unit 701 determines whether or not the viewer instructed the start of reproduction of the moving image. Processing advances to step S903 if it is determined that the start of the reproduction is instructed. Processing in step S902 is repeated if it is determined that the start of the reproduction is not instructed.

In step S903, the control unit 701 acquires the data (captured image, sound and meta data) of the next frame, from the data 505 of the moving image file which was read.

In step S904, the control unit 701 determines whether or not the moving image file which was read was captured and recorded by a camera to which the VR180 lens is attached. Processing advances to step S905 if it is determined that the moving image file was captured and recorded by a camera to which the VR180 lens is attached. Processing advances to step S907 if it is determined that the moving image file was not captured and recorded by a camera to which the VR180 lens is attached.

In step S905, the control unit 701 acquires blur information as the phenomenon information from the meta data of the data of the next frame, from the data 505 of the moving image file acquired in step S903.

In step S906, the control unit 701 determines whether or not the degree of blur is a predetermined level or more, based on the blur information acquired in step S905. In other words, the control unit 701 determines (detects) whether or not the degree of blur will likely be the cause of the VR sickness to the user who is viewing the captured image. Processing advances to step S908 if it is determined that the degree of blur is the predetermined level or more (if it is detected that the degree of blur will likely cause the VR sickness to the user). Processing advances to step S907 if it is determined that the degree of blur is less than the predetermined level.

In step S907, from the data 505 of the moving image file acquired in step S903, the control unit 701 displays the captured image of the data of the next frame on the display unit 706. For example, the control unit 701 applies decode processing on a captured image encoded in H. 264 format or the like. The control unit 701 then converts the decoded captured image into an image based on the equidistant cylindrical projection method. Then the control unit 701 performs the perspective projection transformation on the captured image based on the equidistant cylindrical projection method, and displays the transformed image on the display unit 706.

Figure 10A:
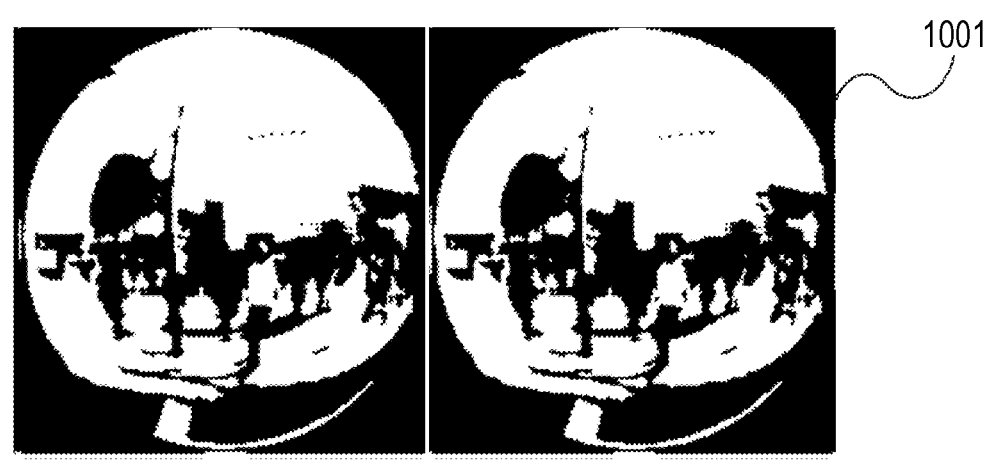
FIGS. 10A and 10B are diagrams for describing image processing according to Embodiment 2.
Figure 10B:

In this case, when the decode processing is performed, dual circumferential fisheye images, such as image 1001 illustrated in FIG. 10A, is generated. Further, when the captured image is transformed on the basis of the equidistant cylindrical projection method, such an image as the image 1002 illustrated in FIG. 10B, is generated. When the perspective projection transformation is performed on the captured image, a part of the image 1002 is deformed and displayed in accordance with the attitude of the HMD 600. In step S907, reproduction processing of the sound data of the next frame is also performed simultaneously.

In step S908, the control unit 701 outputs a warning (notification) since a blur exceeding a predetermined level is generated in the captured image of the data of the next frame, from the data 505 of the moving image file acquired in step S903. For example, the control unit 701 displays a predetermined image to indicate the warning (image to indicate that a blur may be the cause of the VR sickness) on the display unit 706. The control unit 701 may output the warning by sound. Furthermore, the control unit 701 stops reproduction display of the moving image before displaying the captured image of the data of the next frame.

Processing advances to step S902 if the processing in step S908 ends. Therefore reproduction of the moving image is stopped until the start of reproduction of the moving image is instructed again.

In step S909, the control unit 701 determines whether or not the reproduction of the moving image is ended. In the case where the captured image of the final frame of the moving image file acquired in step S903 has already been displayed, or in a case where the viewer instructed to end the reproduction, the control unit 701 determines that the reproduction of the moving image is ended. Processing of this flow chart ends if it is determined that the reproduction of the moving image ended. Processing advances to step S903 if it is determined that the reproduction of the moving image is not ended. In other words, each frame of the moving image can be sequentially displayed by repeating the processing steps S903 to S907.

In Embodiment 2, the control unit 701 stops the reproduction of the moving image in step S908. However, the control unit 701 may skip (not perform) the reproduction of frames of which the degree of blur exceeds a predetermined level, and continue the reproduction of the other frames. Further, the control unit 701 may display, on the display unit 706, a VR sickness level that possibly cause the VR sickness to the user who views the captured image. For example, based on the phenomenon information, the control unit 701 determines the level of the VR sickness which may cause the VR sickness. Then if the level of the VR sickness which may cause the VR sickness (or which level of the phenomenon information) is high (higher than a predetermined level), the control unit 701 may superimpose an icon, indicated by the level of VR sickness (e.g. "VR sickness: high") on the moving image.

The control unit 701 may stop the reproduction of the moving image if the degree of blur is a first threshold or more, and continue the reproduction of the moving image, skipping the next frame, if the degree of blur is a second threshold or more and less than the first threshold. Thereby the reproduction of the moving image can be stopped if the level of the VR sickness which may cause the VR sickness is high, and the reproduction of the moving image itself can be continued if the level of the VR sickness, which may cause the VR sickness, is not very high. In other words, the reproduction of the VR moving image and the reduction of the possibility of VR sickness can be balanced.

Further, in step S906, the control unit 701 may determine a threshold value (a predetermined level) to determine the magnitude of blur, in accordance with the type and function of the display device which displays the moving image. For example, the display device according to Embodiment 2 is the HMD, hence a slight blur may cause the VR sickness to the viewer. Therefore the control unit 701 sets the threshold low. On the other hand, if the display device is a commonly used display, there is a certain distance between the display and the viewer, that is, a slight blur which the viewer perceives is unlikely to cause the VR sickness to the user. Hence, in this case, the control unit 701 sets the threshold higher than the case where the display device is an HMD. Furthermore, in a case where the HMD includes a vibration proof function for the image, and can apply a predetermined vibration proof function to the reproduced image, a slight blur can be cancelled out by the vibration proof processing. Hence the control unit 701 sets the threshold lower than the case where the display device is an HMD which does not include the vibration proof function.

Also just like Embodiment 1, in the case of displaying a list of thumbnails of a plurality of moving images, the HMD 600 may superimpose an icon, indicating the level of VR sickness (e.g., "VR sickness: high" or "VR sickness: low") on each thumbnail. Further, when the image capturing information of a moving image is displayed on the HMD 600, details of the phenomenon information (e.g., type and degree of VR sickness, area causing the VR sickness) may be displayed.

In some cases, blur may be generated immediately after the start of the recording of the moving image and immediately before the end of the recording of the moving image, because of the operation to start recording the moving image and to end recording the moving image (pressing of the shutter button 101) on the camera 100. Hence when a moving image is reproduced on the HMD 600, several frames at the beginning of the moving image and several frames at the end of the moving image may not be reproduced and displayed.

As described above, in Embodiment 2, the phenomenon information, such as camera blur, is acquired when the moving image (VR image) is reproduced on the display device, and the reproduction state on the display device side is changed if the phenomenon level is a predetermined level or more. As a consequence, the phenomenon causing the VR sickness to the user when VR viewing can be prevented.

Embodiment 3

An electronic apparatus according to Embodiment 3 operates on a personal computer (hereafter called "PC") that handles moving image files. The operation of the PC is implemented by software.

In Embodiment 3, a PC 1100 analyzes a phenomenon in a moving image that possibly cause the VR sickness. Then the PC 1100 writes information on the phenomenon that possibly cause the VR sickness in a moving image file. In Embodiment 3, operation or processing the same as Embodiment 1 or 2, is denoted with a same reference sign as Embodiment 1 or 2, and description thereof will be omitted.

Figure 11:
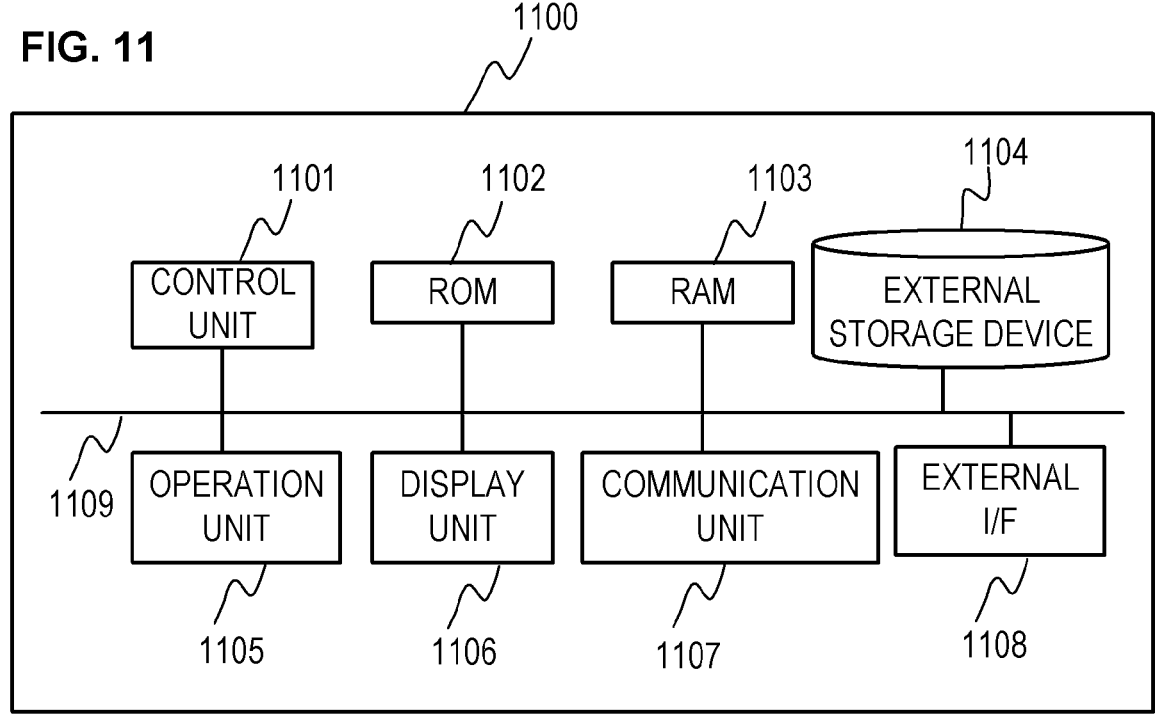
FIG. 11 is a block diagram of a personal computer according to Embodiment 3.

FIG. 11 is a block diagram depicting a configuration of the PC 1100. The PC 1100 is an electronic device that can perform various types of processing on a captured image. The PC 1100 includes a control unit 1101, a ROM 1102, a RAM 1103, an external storage device 1104, an operation unit 1105, a display unit 1106, a communication unit 1107, an external interface (I/F) 1108, and a system bus 1109.

The control unit 1101 controls the PC 1100 in general. The control unit 1101 is a central processing unit (CPU), for example.

The ROM 1102 is a read only memory (ROM) for storing programs and parameters which are not required to change.

The RAM 1103 is a random access memory (RAM) which temporarily stores programs and data supplied from an external device or the like.

The external storage device 1104 is an external storage device installed inside of the PC 1100. The external storage device 1104 may also be an external storage device detachable from the PC 1100. The external storage device 1104 includes: a hard disk, a flash memory, a floppy disk (FD), an optical disk (e.g., compact disk (CD)), a magnetic/optical card, and IC card, a memory card, and the like. A moving image file or the like acquired by the camera is written in the external storage device 1104.

The operation unit 1105 includes operation members (e.g., buttons) which the user operates.

The display unit 1106 displays data held by the PC 1100 and data supplied to the PC 1100.

The communication unit 1107 is a communication unit to communicate with other devices. The external I/F 1108 performs transmission and reception of video signals and files with an external device, such as the camera 100.

The system bus 1109 is a system bus to communicably connect each composing element. In the ROM 1102, predetermined information processing programs have been stored as program codes that can be read by the control unit 1101. The control unit 1101 executes the processing indicated by these program codes.

The operation of the PC 1100 according to Embodiment 3 will be described next, with reference to the flow chart in FIG. 12.

Figure 12:
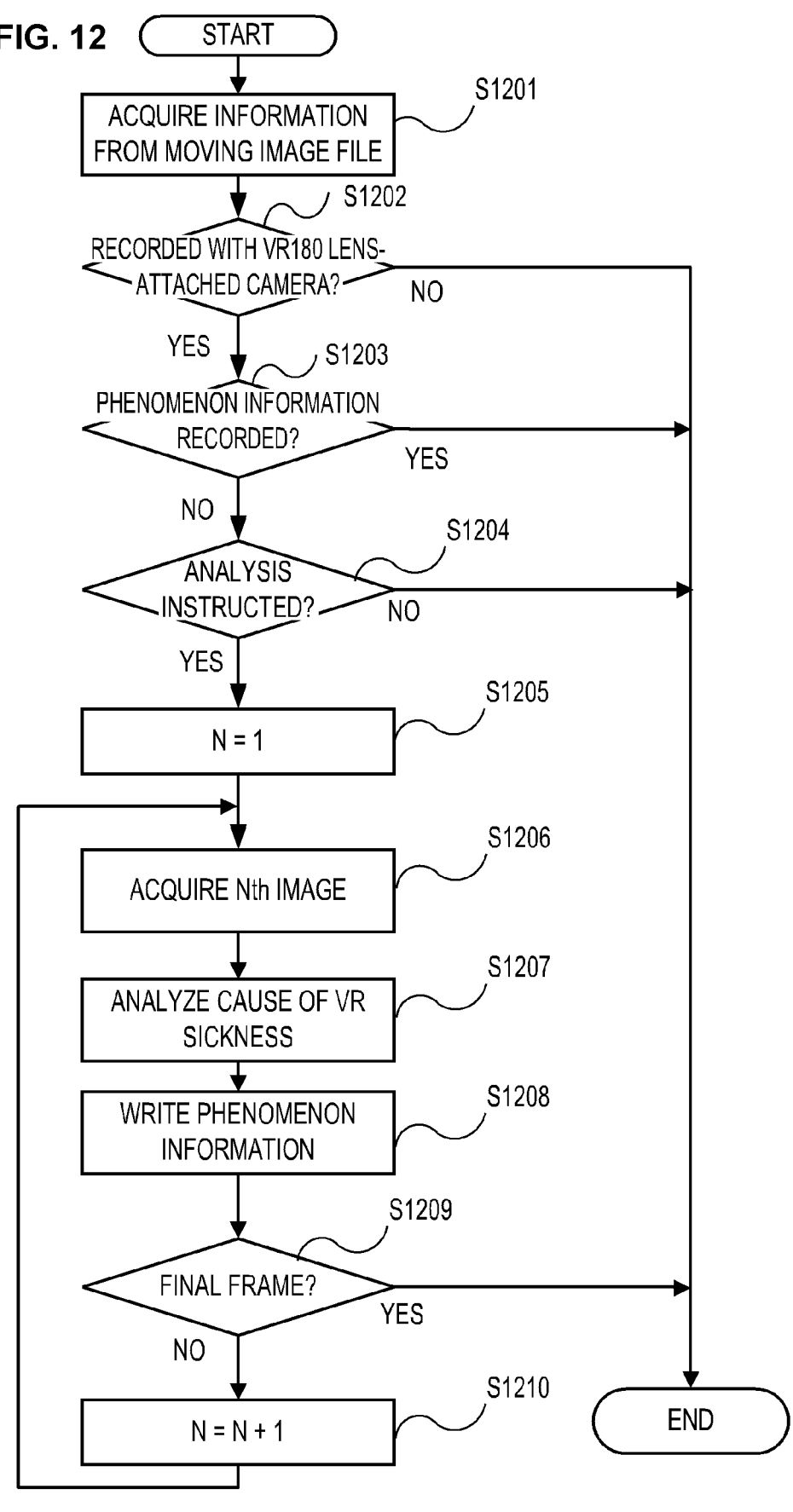
FIG. 12 is a flow chart of processing of the personal computer according to Embodiment 3.

The processing of the flow chart in FIG. 12 starts when the PC 1100 reads a moving image file (acquires a moving image file from the camera 100, or the like). Using the moving image file which was read, the PC 1100 can perform reproduction display, reproduction start and reproduction stop of the moving image by a specific application. Here the configuration of the moving image file is the same as the configuration indicated in FIG. 5 according to Embodiment 1.

In step S1201, the control unit 1101 acquires the image capturing information 502, the meta data 503 and the meta data 504 from the moving image file which was read.

In step S1202, the control unit 1101 determines whether or not the moving image file which was read (captured image) was recorded by a camera to which the VR180 lens (dual lens) is attached. Processing advances to step S1203 if it is determined that the moving image file was recorded by a camera to which the VR180 lens is attached. Processing of this flow chart ends if it is determined that the moving image file was not recorded by a camera to which the VR180 lens is attached.

In step S1203, the control unit 1101 determines whether or not the phenomenon information is recorded in the moving image file which was read. Here the control unit 1101 checks the content of the meta data 503 and the meta data 504, and checks the meta data of the first frame of the data 505. Processing advances to step S1204 if it is determined that the phenomenon information is not recorded in the moving image file. The processing of this flow chart ends if it is determined that the phenomenon information is recorded in the moving image file.

In step S1204, the control unit 1101 determines whether or not an analysis instruction (instruction to analyze a phenomenon that possibly cause VR sickness) was performed for the moving image file which was read. Processing advances to step S1205 if it is determined that the analysis instruction was performed. The processing of this flow chart ends if it is determined that the analysis instruction was not performed.

In step S1205, the control unit 1101 sets a current frame number N to 1 (number indicating the first frame).

In step S1206, the control unit 1101 acquires a captured image of the Nth frame from the moving image file.

In step S1207, in the captured image acquired in step S1206, the control unit 1101 analyzes (detects) a phenomenon that possibly cause the VR sickness. Specifically, the brightness difference, the contrast difference, and the color difference between the right eye image and the left eye image may cause the VR sickness. Therefore the control unit 1101 detects the difference (brightness difference, contrast difference or color difference) between the right eye image and the left eye image of the captured image of the current frame, and acquires the degree of difference as a phenomenon that possibly cause the VR sickness.

In a case where a degree of blur is determined as a phenomenon that possibly cause the VR sickness, the control unit 1101 acquires captured images of several frames before and after the current frame. Then the control unit 1101 extracts a future point of each captured image by a known feature point extraction processing, and calculates the moving distance and the moving direction of the feature points between these frames. If the moving distance between the frames has changed considerably, or if the moving direction changes frequently, then the degree of blur may cause the VR sickness, hence the control unit 1101 acquires the moving distance (change amount) of the feature points as a degree of blur.

In step S1208, the control unit 1101 writes the information on a phenomenon that possibly cause the VR sickness (phenomenon information) acquired in step S1207, to the meta data in the Nth frame in the moving image file. In other words, the Nth frame and the phenomenon information are associated.

In step S1209, the control unit 1101 determines whether or not the Nth frame is the final frame of the moving image file (moving image). The processing of this flow chart ends if it is determined that the Nth frame is the final frame. Processing advances to step S1210 if it is determined that the Nth frame is not the final frame.

In step S1210, the control unit 1101 adds 1 to the current frame number N.

According to the processing in the flow chart in FIG. 12, the PC can store phenomenon information in the moving image file later, even if the phenomenon information is not recorded in the camera.

The phenomenon information of meta data in each frame may be summarized immediately after ending analysis for all frames, and such summary information as the maximum value of the level of the VR sickness (maximum value of the level of phenomenon information) and a section where the level of the VR sickness is high, may be recorded in the meta data 503. Thereby the display device (viewing device) can quickly acquire the information on the level of the VR sickness and the section causing the VR sickness, from the moving image file.

As described above, according to Embodiment 3, the electronic device acquires the phenomenon information (e.g., image blur, difference of brightness, contrast, color or the like between the left eye image and the right eye image), and writes the phenomenon information in the moving image file. Thereby the display device (viewing device) reads the phenomenon information when VR viewing, and performs display control based on the phenomenon information. As a consequence, the occurrence of VR sickness to the user when VR viewing can be prevented.

In each embodiment, an "arbitrary symptom experienced by the user when viewing an image captured by an imaging device to which dual lenses are attached" may be used instead of "VR sickness". For example, the "VR sickness" may be interpreted as "fatigue", "discomfort", "headache", "stomach symptoms", "nausea", "vomiting", "paleness", "sweating", "weariness", "sleepiness", "disorientation" or "dullness".

An electronic device (information processing system), which includes all or part of the configuration of the camera 100 according to Embodiment 1, and the HMD 600 according to Embodiment 2 may be implemented. In this case, the electronic device records a captured image, which the electronic device acquired by imaging, in a file, in association with the phenomenon information, and controls the display of the captured image based on the phenomenon information recorded in the file when the captured image is reproduced.

The present invention can contribute to reducing the possibility that certain symptoms may be experienced by a user who views a VR moving image.

While the present invention has been described on the basis of the preferred embodiments thereof, the present invention is not limited to these specific embodiments, but includes various modes within a scope of not departing from the spirit of the invention. Part of each of the above embodiments may be combined when required.

In the above description, the phrase "processing advances to step S1 if A is B or more, and processing advances to step S2 if A is less (lower) than B" may be interpreted as "processing advances to step S1 if A is larger (higher) than B, and processing advances to step S2 if A is B or less". Furthermore, "processing advances to step S1 if A is larger (higher) than B, and processing advances to step S2 if A is B or less" may be interpreted as "processing advances to step S1 if A is B or more, and processing advances to step S2 if A is smaller (lower) than B". In other words, as long as no inconsistency is generated, "A or more" may be interpreted as "larger (higher; longer; more) than A", and "A or less" may be interpreted as "smaller (lower; shorter; less) than A". Further, "larger (higher; longer; more) than A" may be interpreted as "A or more", and "smaller (lower; shorter; less) than A" may be interpreted as "A or less".

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-001742, filed on Jan. 10, 2023, which is hereby incorporated by reference herein in its entirety.

What is claimed is:

1. An electronic device comprising:

a processor; and a memory storing a program which, when executed by the processor, causes the electronic device to:

(1) acquire a captured image, (2) acquire, in a case where the captured image is an image acquired by imaging of an imaging device to which a dual lens is attached, first information, which is information associated with the captured image and which is information associated with a phenomenon that possibly causes a specific symptom, and (3) record the captured image and the first information in a recording unit so that the captured image relates to the first information, wherein in a case where the captured image is the image acquired by imaging of the imaging device to which the dual lens is attached, the captured image includes (a) a right eye image which is an image for a right eye and (b) a left eye image which is an image for a left eye, and wherein the first information includes information on a difference between the right eye image and the left eye image.

2. The electronic device according to claim 1, wherein the program when executed by the processor causes the electronic device not to relate the captured image to the first information in the recording unit, in a case where the captured image is not an image acquired by imaging of the imaging device to which the dual lens is attached.

3. The electronic device according to claim 1, wherein the program when executed by the processor causes the electronic device to acquire the first information by detecting the phenomenon that possibly causes the specific symptom from the captured image.

4. The electronic device according to claim 1, wherein the program when executed by the processor causes the electronic device to prompt a user to perform imaging to acquire a new captured image in a case where a level of the phenomenon that possibly causes the specific symptom is higher than a predetermined level.

5. The electronic device according to claim 1, wherein the difference between the right eye image and the left eye image is at least one of: an image magnification difference, a vertical deviation, a rotational deviation, a brightness difference, a contrast difference, and a color difference.

6. The electronic device according to claim 1, wherein the specific symptom is VR sickness.

7. The electronic device according to claim 1, wherein the program when executed by the processor causes the electronic device to:

acquire the first information, which is information on a brightness difference between the right eye image and the left eye image, by comparing an average brightness in a predetermined region of the left eye image and an average brightness in a predetermined region of the right eye image.

8. The electronic device according to claim 1, wherein the captured image is a moving image, and wherein the program when executed by the processor causes the electronic device, after recording the moving image to record information on a maximum value of the phenomenon that possibly causes the specific symptom in the moving image, or information on a time block in the moving image in which a level of the phenomenon that possibly causes the specific symptom is high than a predetermined level.

9. An electronic device comprising:

a processor; and a memory storing a program which, when executed by the processor, causes the electronic device to:

(1) acquire a captured image, and first information which is information associated with the captured image and which is information associated with a phenomenon that possibly causes a specific symptom, and (2) control display of the captured image on a display device based on the first information, in a case where the captured image is an image captured by an imaging device to which a dual lens is attached, wherein in a case where the captured image is the image acquired by imaging of the imaging device to which the dual lens is attached, the captured image includes (a) a right eye image which is an image for a right eye and (b) a left eye image which is an image for a left eye, and wherein the first information includes information on a difference between the right eye image and the left eye image.

10. The electronic device according to claim 9, wherein the program when executed by the processor causes the electronic device to:

acquire a level of the phenomenon that possibly causes the specific symptom as the first information, and output a warning to a user in a case where the level of the phenomenon that possibly causes the specific symptom is higher than a first level.

11. The electronic device according to claim 10, wherein the program when executed by the processor causes the electronic device to determine whether the level of the phenomenon that possibly causes the specific symptom is higher than the first level, and wherein as the first level, a lower value is set in a case where the display device is a head-mounted display than a case where the display device is not the head-mounted display.

12. The electronic device according to claim 10, wherein the program when executed by the processor causes the electronic device to determine whether the level of the phenomenon that possibly causes the specific symptom is higher than the first level, and wherein as the first level, a lower value is set in a case where the display device is a head-mounted display including a vibration-proof function than a case where the display device is not a head-mounted display including the vibration-proof function.

13. The electronic device according to claim 9, wherein the captured image is a moving image, and wherein the program when executed by the processor causes the electronic device to:

1) Reproduce the moving image on the display device, 2) skip frames in which a level of the phenomenon that possibly causes the specific symptom is higher than a first level, and 3) Reproduce frames in which the level of the phenomenon that possibly causes the specific symptom is not higher than the first level.

14. The electronic device according to claim 9, wherein the program when executed by the processor causes the electronic device to control display of the captured image on the display device based not only on the first information but also on a type or a function of the display device.

15. The electronic device according to claim 9, wherein the program when executed by the processor causes the electronic device to:

> determine, based on the first information, a level of the specific symptom experienced by a user in a case where the user viewed the captured image, and
>
> control the display device to display the level of the specific symptom in a case where the level of the specific symptom is higher than a second level.

16. The electronic device according to claim 9, wherein the captured image is a moving image, and > wherein the program when executed by the processor causes the electronic device to:
>
> 1) Reproduce the moving image on the display device,
> 2) Stop the reproduction of the moving image in a case where a level of the phenomenon that possibly causes the specific symptom in a next frame to be reproduced is higher than a first level
> 3) Continue the reproduction of the moving image while skipping the next frame to be reproduced in a case where the level of the phenomenon that possibly causes the specific symptom in the next frame to be reproduced is higher than a second level and not higher than the first level.

17. A control method for an electronic device, the method comprising the steps of:

> acquiring a captured image;
>
> acquiring, in a case where the captured image is an image acquired by imaging of an imaging device to which a dual lens is attached, first information which is information associated with the captured image and which is information associated with a phenomenon that possibly causes a specific symptom; and
>
> recording the captured image and the first information in a recording unit so that the captured image relates to the first information,
>
> wherein in a case where the captured image is the image acquired by imaging of the imaging device to which the dual lens is attached, the captured image includes (a) a right eye image which is an image for a right eye and (b) a left eye image which is an image for a left eye, and
>
> wherein the first information includes information on a difference between the right eye image and the left eye image.

18. A control method for an electronic device, the method comprising steps of:

> acquiring a captured image, and first information which is information associated with the captured image and which is information associated with a phenomenon that possibly causes a specific symptom; and
>
> controlling display of the captured image on a display device based on the first information, in a case where > the captured image is an image captured by an imaging device to which a dual lens is attached,
>
> wherein in a case where the captured image is the image acquired by imaging of the imaging device to which the dual lens is attached, the captured image includes (a) a right eye image which is an image for a right eye and (b) a left eye image which is an image for a left eye, and
>
> wherein the first information includes information on a difference between the right eye image and the left eye image.

19. A non-transitory computer readable medium that stores a program, wherein the program causes a computer to execute a control method for an electronic device, the control method comprising the steps of:

> acquiring a captured image;
>
> acquiring, in a case where the captured image is an image acquired by imaging of an imaging device to which a dual lens is attached, first information which is information associated with the captured image and which is information associated with a phenomenon that possibly causes a specific symptom; and
>
> recording the captured image and the first information in a recording unit so that the captured image relates to the first information,
>
> wherein in a case where the captured image is the image acquired by imaging of the imaging device to which the dual lens is attached, the captured image includes (a) a right eye image which is an image for a right eye and (b) a left eye image which is an image for a left eye, and
>
> wherein the first information includes information on a difference between the right eye image and the left eye image.

20. A non-transitory computer-readable medium that stores a program, wherein the program causes a computer to execute a control method for an electronic device, the control method comprising the steps of > acquiring a captured image, and first information which is information associated with the captured image and which is information associated with a phenomenon that possibly causes a specific symptom; and
>
> controlling display of the captured image on a display device based on the first information, in a case where the captured image is an image captured by an imaging device to which a dual lens is attached,
>
> wherein in a case where the captured image is the image acquired by imaging of the imaging device to which the dual lens is attached, the captured image includes (a) a right eye image which is an image for a right eye and (b) a left eye image which is an image for a left eye, and
>
> wherein the first information includes information on a difference between the right eye image and the left eye image.

* * * * *